(12) United States Patent
Kasztenny et al.

(10) Patent No.: US 8,553,379 B2
(45) Date of Patent: Oct. 8, 2013

(54) TRANSFORMER DIFFERENTIAL PROTECTION

(75) Inventors: Bogdan Z. Kasztenny, Markham (CA); Normann Fischer, Colfax, WA (US)

(73) Assignee: Schweitzer Engineering Laboratories Inc, Pullman, WA (US)

( * ) Notice: Subject to any disclaimer, the term of this patent is extended or adjusted under 35 U.S.C. 154(b) by 810 days.

(21) Appl. No.: 12/561,962

(22) Filed: Sep. 17, 2009

(65) Prior Publication Data

US 2011/0063761 A1   Mar. 17, 2011

(51) Int. Cl.
*H02H 7/04* (2006.01)
*H02H 7/045* (2006.01)

(52) U.S. Cl.
USPC ............... 361/36; 361/87; 361/35; 361/63

(58) Field of Classification Search
USPC ........................... 361/87, 36, 63, 35
See application file for complete search history.

(56) References Cited

U.S. PATENT DOCUMENTS

| | | | |
|---|---|---|---|
| 3,546,534 A | 12/1970 | Kotos | |
| 5,367,426 A | 11/1994 | Schweitzer, III | |
| 5,418,776 A | 5/1995 | Purkey | |
| 5,671,112 A | 9/1997 | Hu | |
| 5,805,395 A | 9/1998 | Hu | |
| 6,256,592 B1 | 7/2001 | Roberts | |
| 6,356,421 B1 | 3/2002 | Guzman-Casillas | |
| 6,456,947 B1 | 9/2002 | Adamiak | |
| 6,518,767 B1 | 2/2003 | Roberts | |
| 6,590,397 B2 | 7/2003 | Roberts | |
| 6,879,917 B2 | 4/2005 | Turner | |
| 7,345,863 B2 | 3/2008 | Fischer | |
| 7,425,778 B2 | 9/2008 | Labuschagne | |
| 7,469,190 B2 | 12/2008 | Bickel | |
| 7,472,026 B2 | 12/2008 | Premerlani | |
| 7,812,615 B2 * | 10/2010 | Gajic et al. .................... 324/547 |
| 2007/0070565 A1 | 3/2007 | Benmouyal | |
| 2009/0059447 A1 | 3/2009 | Gajic | |
| 2009/0091867 A1 | 4/2009 | Guzman-Casillas | |

OTHER PUBLICATIONS

Debra Carroll and John Dorfner, Tacoma Power, Tony Lee and Ken Fodero, Schweitzer Engineering Laboratories, Inc., Chris Huntley, GE Lentronics,Resolving Digital Line Current Differential Relay Security and Dependability Problems: A Case History 29th Annual Western Protective Relay Conference, Spokane Washington, Oct. 22-24, 2002.

(Continued)

*Primary Examiner* — Rexford Barnie
*Assistant Examiner* — Zeev V Kitov
(74) *Attorney, Agent, or Firm* — Stoel Rives LLP

(57) ABSTRACT

Transformer differential protection is provided by measuring a plurality of currents corresponding to a first set of windings and a second set of windings of a transformer, and compensating the currents based on their respective flows through either the first set of windings or the second set of windings. The compensated currents may be intentionally augmented to compensate for magnetizing inrush and/or stationary overexcitation conditions associated with the transformer. Augmentation based on stationary overexcitation, for example, may be based on either harmonic restraint or an addition of a V/Hz ratio to a restraining signal. A complex current ratio is calculated corresponding to the plurality of compensated currents. The complex current ratio may be based on a two-terminal equivalent power apparatus. Then, an alpha plane analysis is applied to the complex current ratio. Based on the alpha plane analysis, a power apparatus that includes the transformer is selectively tripped.

31 Claims, 17 Drawing Sheets

(56) References Cited

OTHER PUBLICATIONS

Gabriel Benmouyal, Joe B. Mooney, Schweitzer Engineering Laboratories, Inc., Advanced Sequence Elements for Line Current Differential Protection, 2006.

Demetrios A. Tziouvaras, Jeff Roberts, and Gabriel Benmouyal, Schweitzer Engineering Laboratories, Inc., New Multi-Ended Fault Location Design for Two- or Three-Terminal Lines, Nov. 1, 2004.

Gabriel Benmouyal, Schweitzer Engineering Laboratories, Inc., The Trajectories of Line Current Differential Faults in the Alpha Plane, Sep. 22, 2005.

GE Industrial Systems L90 Line Current Differential System, UR Series Instruction Manual, Section 8, Manual P/N:1601-0081-T1(GEK-113488) L90 revision: 5.6x 2008, Section 8.

PCT/US2010/049162 Patent Cooperation Treaty International Search Report and Written Opinion of the International Searching Authority, Dec. 30, 2010.

* cited by examiner

TRANSFORMER DIFFERENTIAL PROTECTION

TECHNICAL FIELD

This disclosure relates to differential protection systems. More particularly, this disclosure includes systems and methods for transformer differential protection using an alpha plane analysis, harmonic restraint, and/or overexcitation restraint based on a volts per hertz (V/Hz) measurement.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION OF PREFERRED EMBODIMENTS

Introduction

Figure 1:
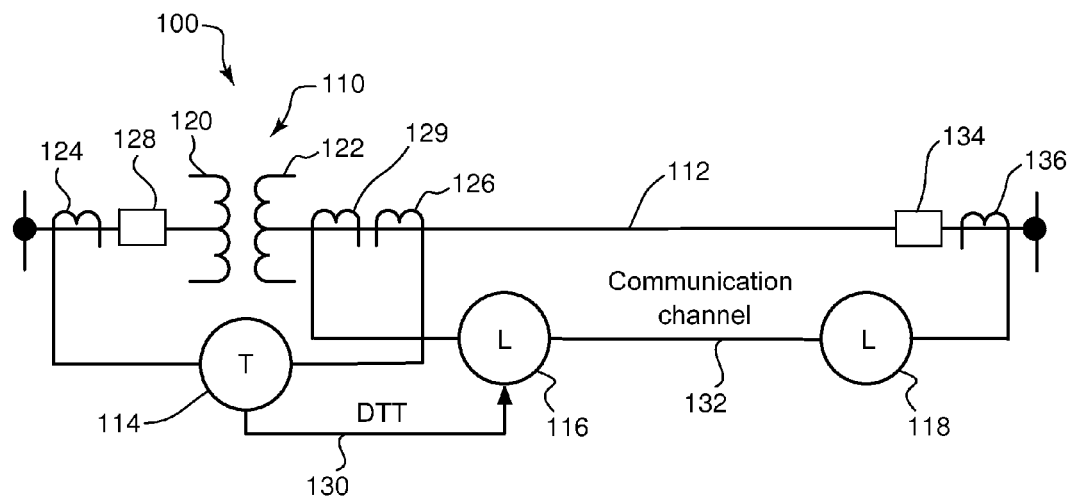
FIG. 1 is a block diagram of a power apparatus that includes an in-line transformer and a transmission line protected by two zones of protection according to one embodiment.

Transformer differential protection is based on comparing measured variables associated with a transformer. For example, transformer differential protection may include comparing the instantaneous values of the phase currents at different ends of the transformer (or at different ends of a power line or other power apparatus that includes a transformer). The current comparison includes both the absolute value (magnitude) and the phase of the measured values.

Before the currents of the individual transformer windings are compared, they are compensated for winding connections (e.g., using vector group matching, ratio matching, and zero-sequence matching) as per the art of transformer differential protection. For example, the currents at the individual ends of a power apparatus that includes a power transformer may be matched with respect to absolute value transformations resulting from rated transformation ratios of the transformer and a current transformer. Because the phase of the measured variables is also included in the current comparison, the phase relations of the amplitude-matched phase currents is also matched in accordance with a respective vector group.

After the currents of the individual ends have been matched, the power apparatus that includes the transformer may be viewed as a current node wherein the sum of the currents of all ends (e.g., a differential current) is equal to zero in fault-free operation under idealized conditions. In other words, under ideal conditions, only an internal fault causes the differential current to differ from zero. In practice, however, magnetizing inrush current and overexcitation conditions associated with the transformer, along with other conditions associated with the power apparatus (e.g., measurement errors) cause the differential current to differ from zero. Thus, internal fault determinations are not based solely on the value of the differential current. Rather, the internal fault determinations are also based on a function of a restraining current, which represents a through-current of the power apparatus being protected, and more thorough analysis of the differential current.

In a power distribution system, for example, sub-transmission lines may be operated with in-line transformers without a breaker between the line and the transformer. These two assets may be protected with a single zone of protection. If a current differential relay is used for protection, the relay's current differential functions should compensate for the transformer winding connections and provide appropriate security during magnetizing inrush and overexcitation conditions. Magnetizing inrush current of a power transformer demonstrates itself as a spurious differential signal and (without proper blocking or restraining) may cause an unwanted relay operation. Stationary overexcitation of the transformer's core due to high voltage and/or low frequency may also create a false differential current, and should be blocked or restrained as well.

Inrush and overexcitation harmonic blocking may be performed by measuring the second and fifth harmonics in the differential current and comparing them with user thresholds. Cross-phase blocking or the fourth harmonic may also be used depending on the relay design and user preferences.

Current differential protection may be performed using either a percentage differential protection principle or an alpha plane protection principle (discussed in detail below) to detect faults. The percentage differential protection principle compares the magnitude of a differential current with a certain percentage of a restraining current. The alpha plane protection principle mitigates problems with communications-based synchronization between multiple relays in a line current different system. In general, however, the alpha protection principle lacks support for the concept of harmonic restraint, which may be used to deal with magnetizing inrush currents and core overexcitation conditions associated with transformers.

Thus, according to certain embodiments disclosed herein, an alpha plane is provided that allows harmonic restraint for transformer differential protection. In such embodiments, the harmonics of interest (e.g., the second, fourth, and/or fifth harmonics) in the differential current are added to restraint terms using appropriate multipliers as per the principles of harmonic restraint. For example, magnetizing inrush restraint is implemented according to certain embodiments by calculating harmonics in the differential current, typically the second harmonic and the fourth harmonic, and adding magnitudes of the harmonics to the restraining signal with the use of user-settable mixing coefficients. In this way, the restraining current is boosted enough so that the alpha plane currents derived from the restraining current fall into the blocking region of the characteristic, which accomplishes the goal of restraining the alpha plane differential function during magnetizing inrush conditions.

In addition, or in other embodiments, the restraining current is augmented based on the overexcitation associated with the transformer. In one such embodiment, stationary overexcitation restraint is accomplished by determining the magnitude of the differential current's fifth harmonic, which is then added (with a mixing coefficient) to the restraining current. This addition increases the restraint and pushes the alpha plane into the blocking region, similar to the inrush restraint described above.

A problem with using the fifth harmonic for stationary overexcitation restraint is that the sampling rate of the line current differential relay may be too low to adequately measure the fifth harmonic of the differential current. From a relay design perspective, working with a communication channel of a limited bandwidth is a general constraint of a microprocessor-based line current differential system. Historically, and practically today, line current differential relays work with 64 kbps channels. Even though direct point-to-point fiber connections allow bandwidths in the range of tens of megabits per second, and multiplexed channels can be requested with a bandwidth of N×64 kbps, the 64 kbps bandwidth continues to be a common application scenario.

Thus, in another embodiment, stationary overexcitation restraint is provided without using the fifth harmonic of the differential current and without substantially increasing the communication payload between remotely located relays. As discussed above, overexcitation is due to applying too high of a voltage and/or too low of a frequency to the transformer, which causes the transformer's core to draw more current. Thus, in one embodiment, each relay with access to a voltage source calculates a volts per hertz (V/Hz) ratio, which may be responsible for over-fluxing the transformer's core. Each relay compares its V/Hz measurement to a threshold value. If the measured V/Hz ratio is too high (typically above 110% of its nominal value), the relay adds a value based on the V/Hz ratio to its local restraining current (which represents a partial value of the overall restraining current).

The relay then sends its local restraining current, along with an indication of whether or not it has augmented its local restraining current based on its V/Hz value. Likewise, the relay receives signals from the other relays with indications of whether or not they have compensated their respective restraining currents based their own V/Hz determinations. As discussed in detail below, the net effect is a boost in the restraining current that may be used with either the percentage differential protection principle or the alpha plane protection principle. When using the alpha plane principle, for example, the boosted restraining current pushes the equivalent alpha plane toward its blocking region, thus accomplishing the goal of restraining during overexcitation conditions.

The systems and methods disclosed herein may be used to provide current differential protection to a wide variety of transformers, including power transformers, auto-transformers, phase-shifting transformers, or other types of transformers. For illustrative purposes, certain example embodiments disclosed herein provide protection for an in-line transformer of a power transmission line. An artisan will recognize from the disclosure herein, however, that the disclosed principles may be applied to any protected plant or power apparatus that includes a transformer. As used herein, a "power apparatus" is a broad term that includes its normal and customary meaning and may include, for example, a power transmission line, a power bus, a large motor, a generator, a transformer, a combination of the foregoing, or any other device or devices that may be removed from a power system (e.g., using breakers and/or relays) when a fault is detected. A power system, for example, may be divided into zones of protection to allow for the removal of a minimal amount of equipment from the power system during a fault condition. Each zone may be associated with its own protection system such that a fault within a particular zone causes the corresponding protection system to operate, whereas a fault in another zone will not cause the protection system to operate. The zone boundaries may be defined by the location of measuring points (e.g., current transformers) and circuit breakers that operate to isolate the zone.

An alpha plane protection system is disclosed in U.S. Pat. No. 6,518,767, titled "Line Differential Protection System for a Power Transmission Line," which is assigned to the assignee of the present disclosure, and which is hereby incorporated herein for all purposes. The alpha plane current differential protection principle (or alpha plane principle) disclosed in U.S. Pat. No. 6,518,767 provides a line differential protection system that, while still dependent upon a communication channel, includes significant improvements relative to other system considerations, including high fault resistance coverage and improved operating characteristics and sensitivity, while at the same time maintaining power system security.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or detailed description is for illustrative purposes only and is not meant to imply a required order, unless specified to require an order.

Embodiments may include various steps, which may be embodied in machine-executable instructions to be executed by a general-purpose or special-purpose processor or computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform the processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/computer-readable medium suitable for storing electronic instructions.

Transformer Protection Using the Alpha Plane

As discussed above, certain example embodiments include the protection of an in-line transformer. A power transmission line and a transformer may be installed without a breaker in-between to separate the two pieces of equipment. This may be driven by economics, particularly in cases when the line is not tapped or multi-terminal and the transformer does not feed any other loads. Thus, installing a separating breaker does not add any operational flexibility. The lack of a separating breaker puts both the line and the transformer into the same trip zone regardless of which element actually requires isolation from the rest of the system. As discussed below, there are many different possible configurations for measuring currents flowing through a power apparatus that includes an in-line transformer. The disclosed embodiments provide an alpha plane analysis for determining internal faults, regardless of the particular configuration or number of currents measured.

In certain embodiments, for example, two zones of protection are used even if each zone trips both the line and the transformer. For example, FIG. 1 is a block diagram of a power apparatus 100 that includes an in-line transformer 110 and a transmission line 112 protected by two zones of protection according to one embodiment. In this example embodiment, a transformer current differential relay 114 corresponds to a first zone of protection that is based on measuring winding currents flowing through a first set of windings 120 and a second set of windings 122 of the transformer 110. An artisan will understand that the embodiments disclosed herein may apply to embodiments with more than two sets of windings. A first line current differential relay 116 and a second line current differential relay 118 correspond to a second zone of protection that is based on measuring currents at each end of the transmission line 112. As discussed in detail below, any of the current differential relays 114, 116, 118 may selectively trip the power apparatus 100 (e.g., isolating the transformer 110 and the transmission line 112 from a load or other portions of a power distribution system) based on an alpha plane analysis.

As shown in FIG. 1, a local terminal of the power apparatus 100 includes the transformer 110, the transformer current differential relay 114, a first current transformer (CT) 124 configured to measure winding currents corresponding to the first set of windings 120, a second CT 126 configured to measure winding currents corresponding to the second set of windings 122, a first breaker 128 electrically coupled to the first set of windings 120, the first line current differential relay 116, and a third CT configured to measure currents flowing through a first end of the transmission line 112. An artisan will recognize from the disclosure herein that, because the first end of the transmission line 112 is electrically connected to the second winding 122 of the transformer within the local terminal, the second CT 126 and the third CT 129 may be combined in certain embodiments into a single CT. As shown, in certain embodiments the transformer current differential relay 114 may operate the remote breaker via the first line current differential relay 116 wherein the transformer current differential relay 114 provides a trip command to the first line current differential relay 116 through a direct transfer tripping signal (DTT) 130. A remote terminal of the power apparatus 100 includes the second line current differential relay 118 that is in communication with the first line current differential relay 116 through a communication channel 132, a second breaker 134, and a fourth CT 136 configured to measure currents flowing through a second end of the transmission line 112.

For the first zone of protection, the transformer current differential relay 114 receives a first current value from the first CT 124 and a second current value from the second CT 126. Based on the first and second current values, the transformer current differential relay 114 uses the methods disclosed herein to monitor the power apparatus 100 for faults within the transformer 110. When the system detects a fault condition, the transformer current differential relay 114 sends a trip command using the DTT signal 130 to the first line current differential relay 116, which communicates through the communication channel 132 to the second line current differential relay 118 to trip the second breaker 134. Thus, the transformer current differential relay 114 may isolate the transformer 110 and the transmission line 112.

For the second zone of protection, the first line current differential relay 116 receives a third current value from the third CT 129 and the second line current differential relay 118 receives a fourth current value from the fourth CT 136. As discussed below, the first and second line current differential relays 116, 118 exchange information corresponding to their respectively measured currents to monitor the power apparatus 100 for internal faults. When the system detects an internal fault condition, the line current differential relays 116, 118 cooperate to trip the first and second breakers 128, 134. Thus, the first and second line current differential relays 116, 118 cooperate to isolate the transformer 110 and the transmission line 112.

By using relays designed for a given type of apparatus, the overall performance of the protection system may be increased. For example, using the transformer current differential relay 114, sensitivity to transformer faults may be increased.

Figure 2:
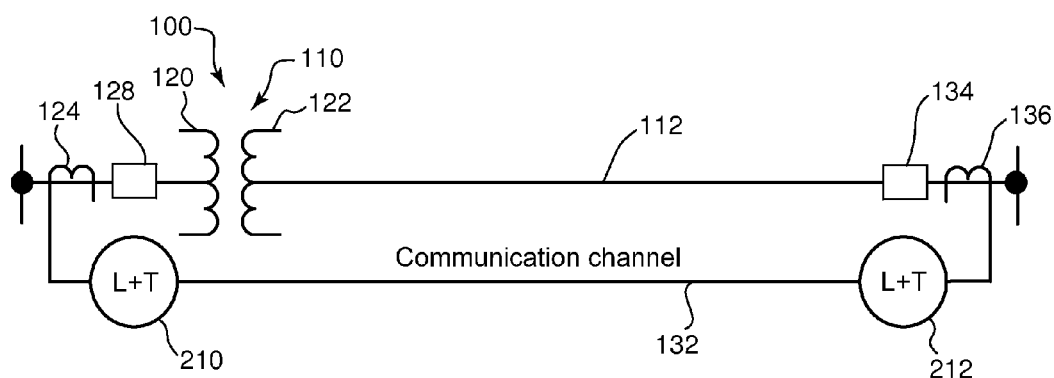
FIG. 2 is a block diagram of the power apparatus shown in FIG. 1 protected by a single zone of protection according to one embodiment.

In certain embodiments, however, the two measuring zones are combined in a line current differential relay that includes an in-line transformer feature. For example, FIG. 2 is a block diagram of the power apparatus 100 shown in FIG. 1 protected by a single zone of protection according to one embodiment. In this example embodiment, a first line current differential relay 210 and a second line current differential relay are each configured to provide transformer differential protection. At the local terminal, the first line current differential relay receives current values from the CT 124 corresponding to the first set of windings 120. Similarly, at the second terminal, the second line current differential relay 212 receives current values from the CT 136 corresponding to the second winding 122. The first and second line current differential relays 210, 212 process their respective currents and communicate with each other through the communication channel 132, as discussed in detail below, to monitor the power apparatus 100 for internal faults. When an internal fault is detected, the first and second line current differential relays 210, 212 trip their respective breakers 128, 134 to isolate the transformer 110 and the transmission line 112 from loads or other portions of the power transmission system. As compared to the embodiment illustrated in FIG. 1, the embodiment of FIG. 2 simplifies protection of the power apparatus 100 using fewer relays, using less wiring, and using less labor to establish and maintain the protection system. Other example protection system configurations are discussed below. An artisan will understand from the disclosure herein that the transformer protection embodiments disclosed herein may be used with any number of protection zones, with any type of transformer, and/or with any type of power apparatus (including a power apparatus that only includes a power transformer).

Figure 3:
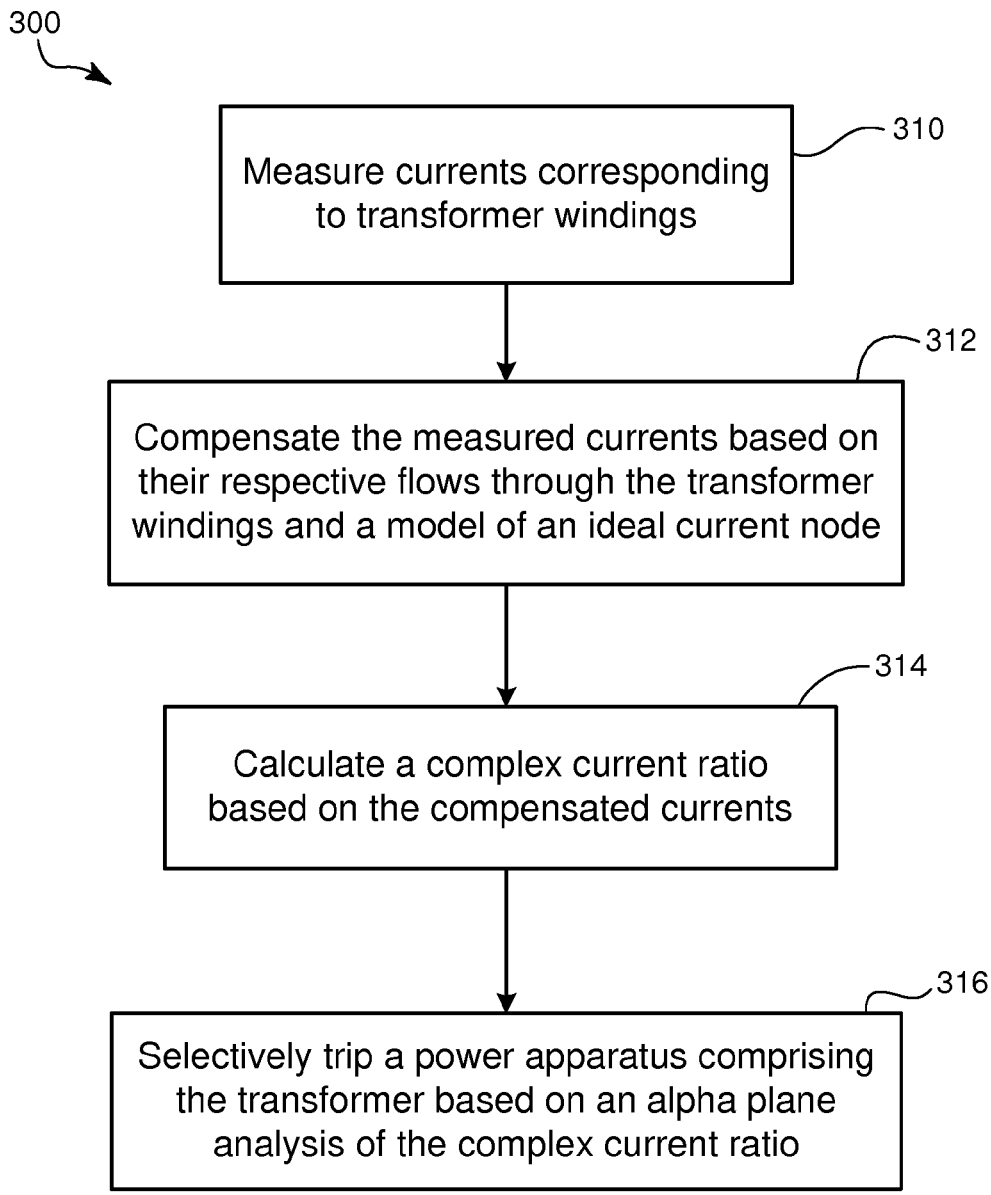
FIG. 3 is a flow diagram of a method for transformer differential protection using the alpha plane according to one embodiment.

FIG. 3 is a flow diagram of a method 300 for transformer differential protection using the alpha plane according to one embodiment. The method 300 includes measuring 310 currents corresponding to transformer windings, and compensating 312 the measured currents based on their respective flows through the transformer windings and a model of an ideal current node. As discussed above, the winding currents are compensated for transformer connections to follow the art of transformer differential protection. Commonly referred to as ratio (tap) matching, zero-sequence removal and vector group compensation, the differential current equations actually match ampere-turns for a healthy transformer. For example, for one type of a delta/wye transformer the following equations describe the differential current $I_{DIF}$:

$$I_{DIF(1)} = k_\Delta \cdot I_{\Delta A} + k_Y \cdot \frac{1}{\sqrt{3}} \cdot (I_{YA} - I_{YB}), \tag{1A}$$

$$I_{DIF(2)} = k_\Delta \cdot I_{\Delta B} + k_Y \cdot \frac{1}{\sqrt{3}} \cdot (I_{YB} - I_{YC}), \tag{1B}$$

$$I_{DIF(3)} = k_\Delta \cdot I_{\Delta C} + k_Y \cdot \frac{1}{\sqrt{3}} \cdot (I_{YC} - I_{YA}). \tag{1C}$$

In equations (1A), (1B), and (1C), referred to collectively as equation (1), the currents I are phasors or instantaneous values, taps $k_\Delta$ (corresponding to the delta winding) and $k_Y$ (corresponding to the wye winding) are based on the CT and transformer ratios, indices A, B, and C respectively refer to the A phase, the B phase, and the C phase of a three-phase system, and indices 1, 2, and 3 refer to the loops or "phases" of the differential function.

As discussed above, the restraining current provides a notion of the current flowing through a zone of protection. Thus, depending on the particular application, the restraining current $I_{RST}$ may be defined as the maximum measured current (e.g., where the highest current corresponds to an external fault current), a summation of current amplitudes, a summation of currents that is divided by the total number of currents (e.g., the average current), or a product of currents. In the example embodiments disclosed herein, the restraining current $I_{RST}$ is defined as a summation of current amplitudes. Thus, continuing the example from equation (1), the following equations describe the restraining current $I_{RST}$:

$$I_{RST(1)} = k_\Delta \cdot |I_{\Delta A}| + k_Y \cdot \frac{1}{\sqrt{3}} \cdot |I_{YA} - I_{YB}|, \tag{2A}$$

$$I_{RST(2)} = k_\Delta \cdot |I_{\Delta B}| + k_Y \cdot \frac{1}{\sqrt{3}} \cdot |I_{YB} - I_{YC}|, \tag{2B}$$

$$I_{RST(3)} = k_\Delta \cdot |I_{\Delta C}| + k_Y \cdot \frac{1}{\sqrt{3}} \cdot |I_{YC} - I_{YA}|, \tag{2C}$$

where $|I|$ represents a magnitude of a current I.

Equations (2A), (2B), and (2C) may be referred to collectively as equation (2). An artisan will recognize from the disclosure herein that compensation for different types of transformers (e.g., two-winding transformers, delta/delta transformers, wye/wye transformers, and other transformer configurations) will result in different differential and restraining currents. An artisan will further understand that there are other ways to compensate the winding currents of a delta/wye transformer. Accordingly, the differential and restraining currents provided in equation (1) and equation (2) are provided by way of example only, and not by limitation.

Returning to FIG. 3, after compensating 312 the measured currents, the method calculates 314 a complex current ratio based on the compensated currents. As discussed in detail below, the alpha plane principle determines the presence of internal faults by analyzing a complex current ratio k of two currents. An internal fault is likely present if the complex current ratio k is in an operate region of the alpha plane. On the other hand, an internal fault is unlikely if the complex current ratio is in a restrain region of the alpha plane. Thus, the method 300 further includes selectively tripping 316 a power apparatus comprising the transformer (e.g., the power apparatus 100 shown in FIGS. 1 and 2) based on an alpha plane analysis of the complex current ratio.

Using Partial Differential and Partial Restraining Currents

For a general case on an N-winding transformer, the differential and restraining currents are sums of ratio matched and vector compensated winding currents. Thus, one embodiment determines partial differential and partial restraining currents at each relay or terminal of the power apparatus by compensating the individual currents for transformer connections based on the position of the currents with respect to the various transformer windings. Each terminal or relay then transmits its respective partial differential and partial restraining currents to the other relays of the differential system protecting the power apparatus. Thus, each relay can determine the overall differential and restraining currents.

As discussed below, the partial differential and partial restraining currents, and/or the overall differential and restraining currents, may be augmented before being used in a percentage differential or alpha plane analysis. In certain embodiments, as discussed below, the overall differential and restraining currents are used to determine equivalent currents of a two-terminal equivalent power apparatus for use with the alpha plane analysis.

Returning to the delta/wye transformer example associated with equations (1) and (2) above, a line terminal associated with the delta winding may perform the following operations to obtain its partial differential currents for transmission:

$$I_{DIF(1\Delta)} = k_\Delta \cdot I_{\Delta A}, \tag{3A}$$

$$I_{DIF(2\Delta)} = k_\Delta \cdot I_{\Delta B}, \tag{3B}$$

$$I_{DIF(3\Delta)} = k_\Delta \cdot I_{\Delta C}. \tag{3C}$$

Equations (3A), (3B), and (3C) may be referred to collectively as equation (3). Further, a terminal associated with the wye winding may perform the following operations to obtain its partial differential currents for transmission:

$$I_{DIF(1Y)} = k_Y \cdot \frac{1}{\sqrt{3}} \cdot (I_{YA} - I_{YB}), \quad (4A)$$

$$I_{DIF(2Y)} = k_Y \cdot \frac{1}{\sqrt{3}} \cdot (I_{YB} - I_{YC}), \quad (4B)$$

$$I_{DIF(3Y)} = k_Y \cdot \frac{1}{\sqrt{3}} \cdot (I_{YC} - I_{YA}). \quad (4C)$$

Equations (4A), (4B), and (4C) may be referred to collectively as equation (4). After a terminal has transmitted its current values, received signal values from the other terminals, and aligned the current values, the terminal may then determine the overall differential currents by summating the appropriate partial differential currents. For example, $I_{DIF(1)}$ of equation (1A) is the summation of $I_{DIF(1A)}$ of equation (3A) and $I_{DIF(1Y)}$ of equation (4A). Similarly, partial restraining currents may be calculated as the magnitudes of the corresponding currents in equations (3) and (4), and combined after transmission and alignment to determine the overall restraining currents of equation (2).

Once each terminal determines its own partial differential and partial restraining currents, according to certain embodiments, the terminals may process the resulting currents as if there were no in-line transformer. In one embodiment, for example, each terminal subtracts a local contribution to a line charging current from its partial differential current. In addition, or in other embodiments, each terminal may calculate sequence restraint terms. In addition, or in other embodiments, each terminal may perform harmonic blocking and/or harmonic restraint, discussed below.

Figure 4:
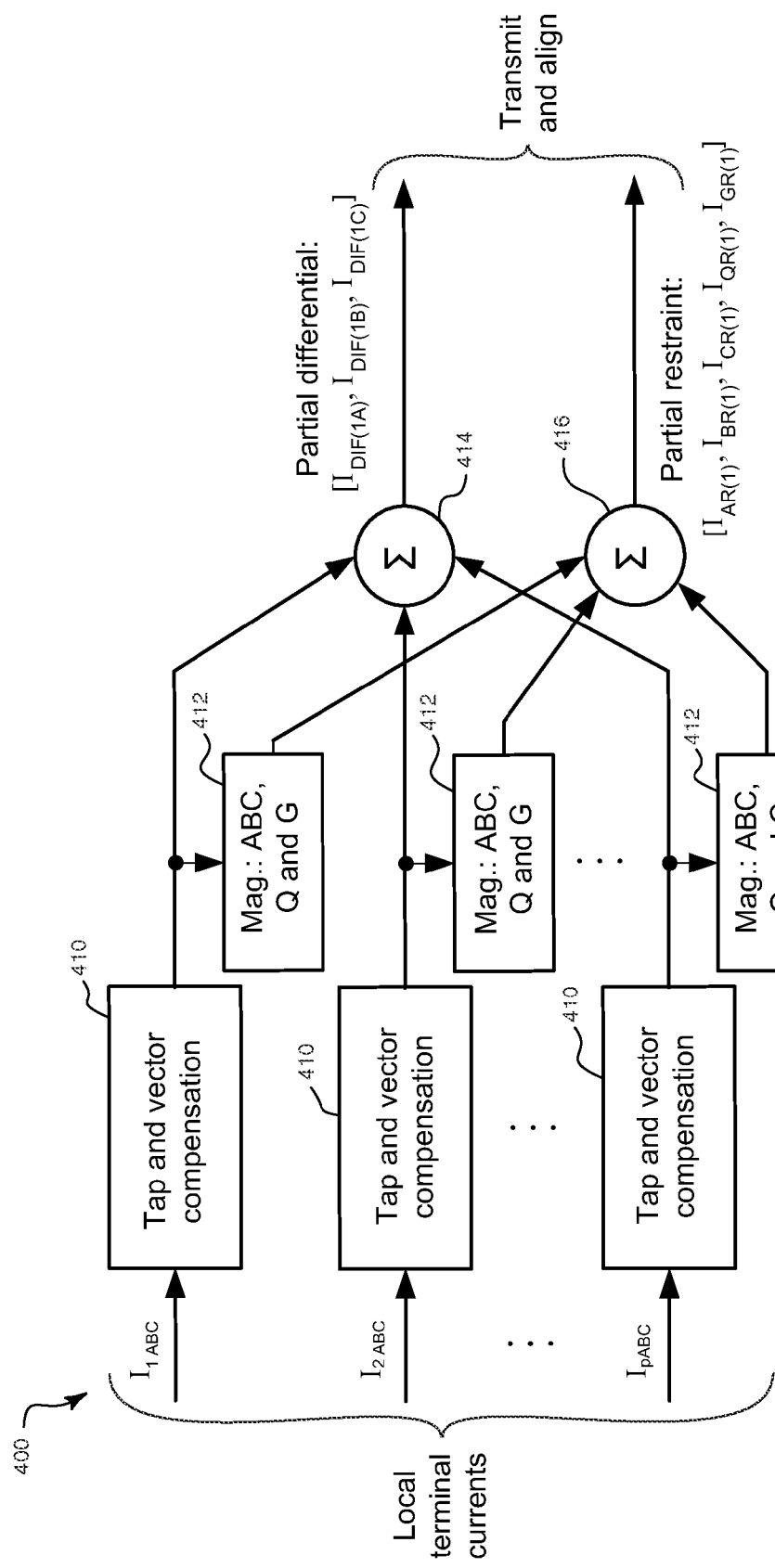
FIG. 4 is a block diagram of a module for determining partial differential and partial restraining currents according to one embodiment.

FIG. 4 is a block diagram of a module 400 for determining partial differential and partial restraining currents according to one embodiment. The module 400 includes a plurality of tap and vector compensation components 410. Each tap and vector compensation component 410 is configured to process a plurality of currents ($I_{1ABC}, I_{2ABC}, \ldots I_{PABC}$) corresponding to a respective set of transformer windings. The tap and vector compensation components 410 provide the ratio (tap) matching, zero-sequence removal, and vector group compensation discussed above.

The module 400 also includes a plurality of magnitude modules 412 for determining absolute values of the compensated currents, including absolute values of currents corresponding to phase currents A, B, and C, and ground and negative-sequence currents G, Q. A first summation component 414 summates the compensated currents produced by each of the tap and vector compensation components 410 to determine partial differential currents $I_{DIF(1A)}$, $I_{DIF(1B)}$, $I_{DIF(1C)}$. A second summation component 416 summates the absolute values generated by the magnitude modules 412 to determine partial restraining currents $I_{AR(1)}$, $I_{BR(1)}$, $I_{AR(1)}$, $I_{QR(1)}$, $I_{GR(1)}$.

Addressing Inrush and Overexcitation Conditions

After compensating for transformer connections, certain embodiments address the inrush and overexcitation conditions associated with transformers. Inrush and overexcitation harmonic blocking may be performed by measuring the second and fifth harmonics in the differential current and comparing them with user thresholds. Cross-phase blocking or the fourth harmonic may also be used.

In addition, or in other embodiments, harmonic restraint may also be used to account for inrush and overexcitation conditions. The harmonics of interest in the differential current (second, fourth and fifth) are added to the fundamental frequency restraint terms using appropriate multipliers as per the principles of harmonic restraint. Subsequently, the alpha plane calculations discussed below are executed. If the restraint terms are increased sufficiently by the harmonics in the differential signal, the boosted restraint will shift the alpha plane toward the blocking point and restrain the differential function during inrush conditions.

Figure 5:
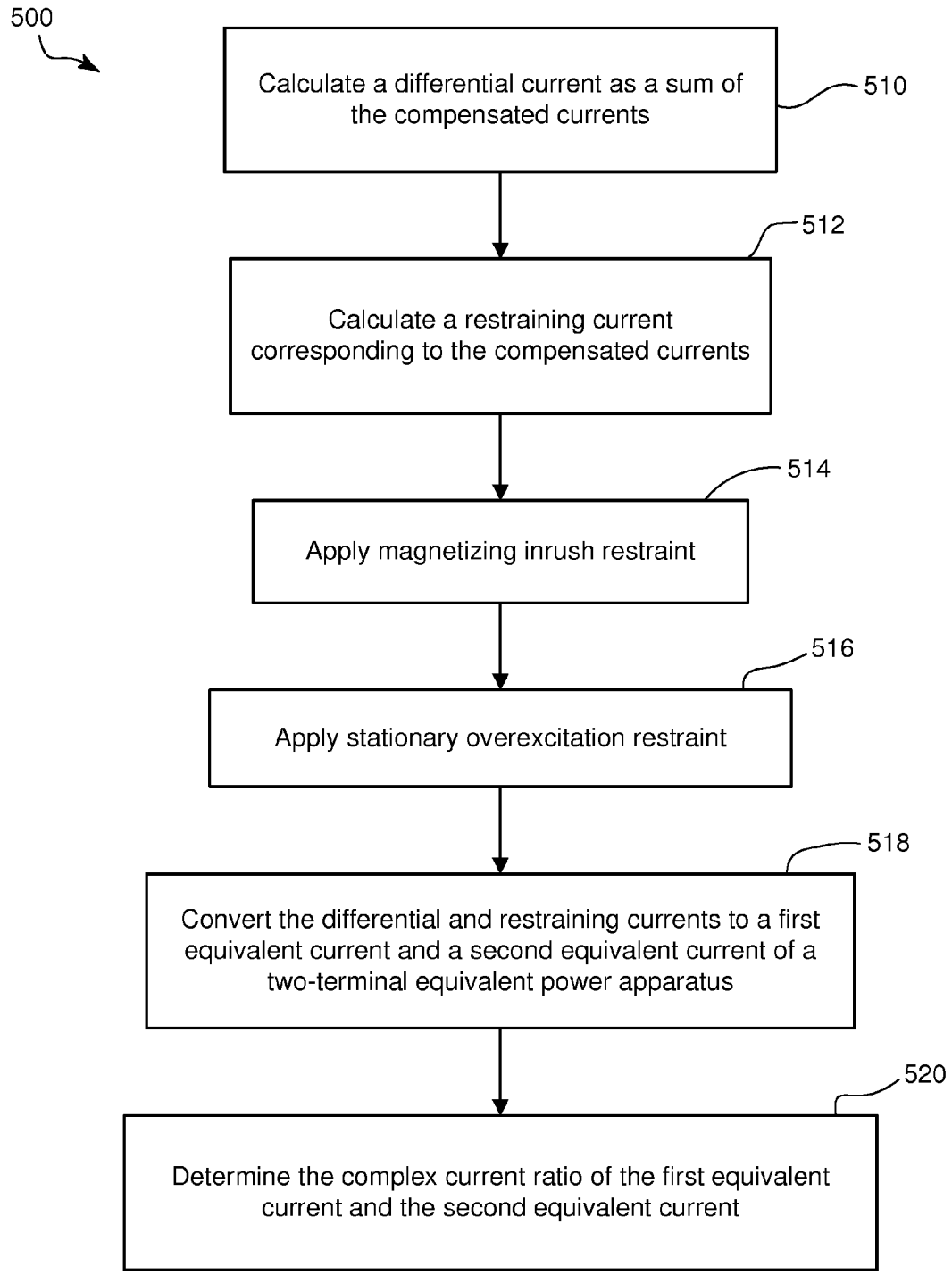
FIG. 5 is a flow chart of a method for transformer differential protection with harmonic restraint according to one embodiment.

FIG. 5 is a flow chart of a method 500 for transformer differential protection with harmonic restraint according to one embodiment. After compensating the winding currents as discussed above, the method 500 includes calculating 510 a differential current as a sum of the compensated currents and calculating 512 a restraining current corresponding to the compensated currents. The method 500 also includes applying 514 magnetizing inrush restraint. In one embodiment, magnetizing inrush restraint is implemented by determining harmonics in the differential current, such as the second harmonic and the fourth harmonic, and adding the magnitudes of the harmonics to the total restraining current with user-selected mixing coefficients.

The method 500 also includes applying 516 stationary overexcitation restraint. In one embodiment, overexcitation restraint is implemented by calculating the fifth harmonic of the differential current and adding the magnitude of the fifth harmonic to the total restraining current using user-selected mixing coefficients. In another embodiment, a V/Hz ratio is calculated and compared to a threshold value. In one embodiment, the threshold value is in a range between approximately 110% and approximately 115% of a nominal value for the V/Hz ratio. If the V/Hz ratio exceeds the threshold value, an auxiliary value based on the V/Hz ratio is added to the restraining current. In one embodiment, the auxiliary value added to the restraining current is $g*(V/Hz)^2$, where g is a scaling factor that may be selected based on the magnetizing characteristic of the protected transformer. The scaling factor g may be the same for all transformers. In other embodiments, the value of the scaling factor g may differ for particular transformers or particular transformer applications because the scaling factor g factors CT and transformer ratios, or even VT ratios if the voltage is in secondary volts. The augmented restraining current may be used with either the percentage differential protection principle or the alpha plane protection principle.

As discussed in detail below, the method 500 also includes converting 518 the differential and restraining currents to a first equivalent current and a second equivalent current of a two-terminal equivalent power apparatus, and determining 520 the complex current ratio of the first equivalent current and the second equivalent current 520.

Figure 6:
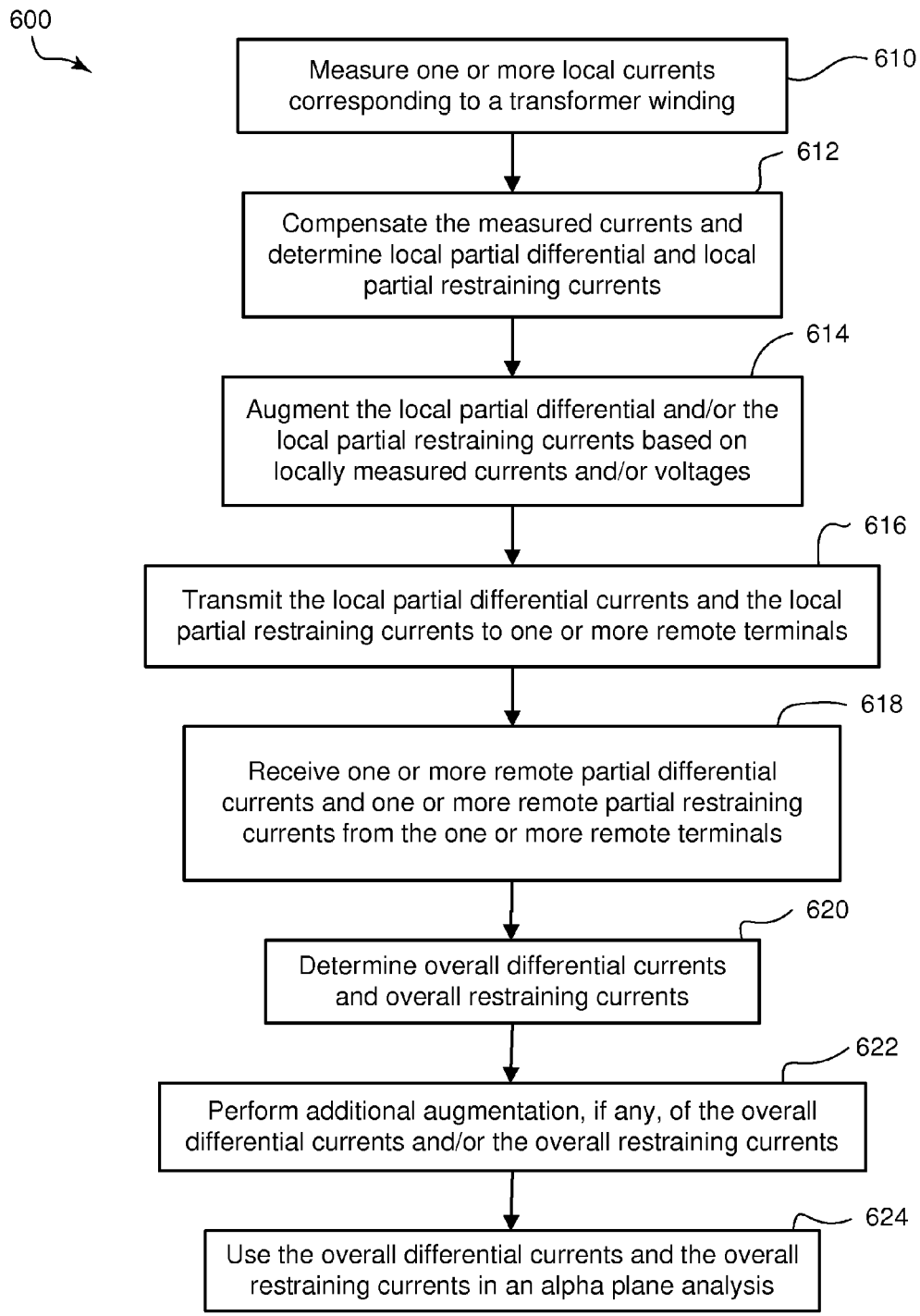
FIG. 6 is a flow chart of a method for transformer differential protection that includes augmenting partial differential currents and/or partial restraining currents according to one embodiment.

FIG. 6 is a flow chart of a method 600 for transformer differential protection that includes augmenting partial differential currents and/or partial restraining currents according to one embodiment. The method 600 includes measuring 610 one or more local currents corresponding to a transformer winding. As discussed above, the method also includes compensating 612 the measured currents and determining local partial differential currents and local partial restraining currents. The method 600 further includes augmenting 614 the local partial differential currents and/or the local partial restraining currents based on locally measured currents and/or voltages. For example, a local terminal may subtract a local portion of a charging current from the local partial differential current. In addition, or in another embodiment, the local terminal may augment the local restraining current based on harmonics of the local differential current to implement magnetizing inrush restraint and/or stationary overexcitation restraint.

The method 600 further includes transmitting 616 the local partial differential currents and the local partial restraining currents to one or more remote terminals, and receiving 618 one or more remote partial differential currents and one or more remote partial restraining currents from the one or more remote terminals. Based on the exchanged information, the method 600 further includes determining 620 overall differential currents and overall restraining currents.

At this point, the method 600 may also include performing 622 additional augmentation, if any, of the overall differential currents and/or the overall restraining currents. For example, in one embodiment, the respective partial restraining currents may be augmented based on stationary overexcitation restraint (e.g., to avoid the resolution needed to determine the fifth harmonic of the differential current), but at least one of line charging compensation and magnetizing inrush restraint are applied to the overall differential currents and/or the overall restraining currents.

As discussed in detail below, the method 600 also includes using 624 the overall differential currents and the overall restraining currents in an alpha plane analysis.

Figure 7:
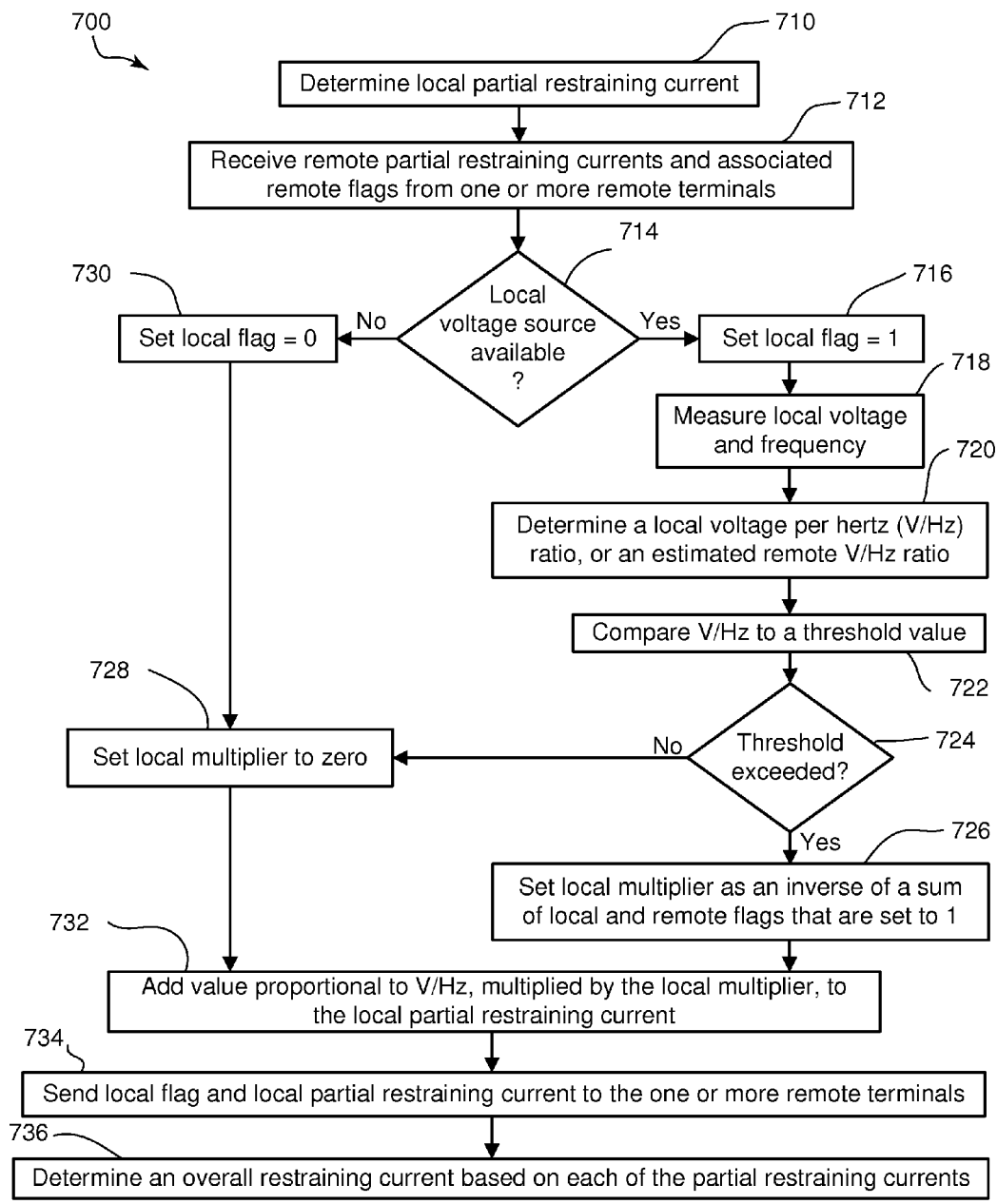
FIG. 7 is a flow chart of a method for transformer differential protection using stationary overexcitation restraint according to one embodiment.

FIG. 7 is a flow chart of a method 700 for transformer differential protection using stationary overexcitation restraint according to one embodiment. In this embodiment, voltages available at one or more terminals are used to augment the restraining current. While the method 700 may be performed by a local terminal, an artisan will recognize from the disclosure herein that the method 700 may be performed by each terminal in a protection system.

The local terminal determines 710 a local partial restraining current, as discussed below, and receives 712 remote partial restraining currents and associated remote flags from one or more remote terminals. The remote flags indicate whether or not the corresponding remote terminals have access to an available voltage source. A voltage source may become unavailable to a particular terminal, for example, under loss of potential conditions, or when bus-side VTs are used and the line is opened (disconnected from the bus via an open breaker or disconnect switch). In this example, a flag set to zero indicates that the corresponding terminal does not have access to a valid voltage source, whereas a flag set to one indicates that the corresponding terminal has access to a valid voltage source.

The local terminal determines 714 whether a local voltage source is available. If a valid local voltage source is available, the local terminal sets 716 a local flag equal to one, measures 718 the local voltage and a frequency, and determines 720 a local voltage per hertz (V/Hz) ratio, or an estimated remote V/Hz ratio. If the one or more VTs used to measure the local voltage at a transformer winding, then the measured local voltage value is used for the V/Hz ratio. If, however, the one or more VTs used to measure the local voltage are located away from the corresponding transformer winding (e.g., the transformer is located at a remote location from the local terminal), then the locally measured voltage may be different than the actual voltage applied to the corresponding transformer winding. Frequency is a global variable that may be substantially the same at all terminals of the power apparatus. Voltages, however, may vary between the various terminals. For example, a voltage measured at a remote terminal where the transformer is located may be approximately 5% to 10% different than a voltage measured by a local terminal. These voltage differences may produce a large difference in the amount of expected overexcitation in the transformer and the amount of V/Hz restraint used to address the condition.

Thus, in some embodiments, the local terminal calculates a remote voltage $V_{Remote}$ that is responsible for the over-fluxing of the transformer's core. The local terminal may determine the remote voltage $V_{Remote}$ as $$V_{Remote} = V_{Local} - I_{Local} * Z_{Line}, \quad (5)$$

where $Z_{Line}$ is the impedance of the transmission line between the local and remote terminals, $V_{Local}$ is a measured local voltage, and $I_{Local}$, is a measured local current. The local current may use the calculated $V_{Remote}$ value in the V/Hz ratio for subsequent stationary overexcitation restraint calculations.

After determining the V/Hz ratio, the local terminal compares 722 the V/Hz ratio to a threshold value, and queries 724 whether the V/Hz ratio exceeds the threshold value. If the threshold value is exceeded by the V/Hz ratio, the local terminal sets 726 the local multiplier as an inverse of a sum of local and remote flags that are set to one. For example, if the local terminal and two remote terminals each have access to a valid voltage source, then the local multiplier (as well as the multipliers used at the remote terminals) would equal ⅓. If one of the voltage sources subsequently became unavailable to one of the remote terminals (causing the corresponding remote flag to change from one to zero), then the local multiplier would change to ½. Similarly, if both remote terminals lost access to their respect voltage sources, then the local multiplier would change to one. If the threshold value is not exceeded by the V/Hz ratio, then the local terminal sets 728 the local multiplier to zero. Thus, if one or more of the voltages fail, the remaining voltage(s) may continue to be used to provide restraint. This allows the restraining function to tolerate problems with voltage sources by using multiple sources located at different line terminals and adaptively using voltage sources that are available.

If the local terminal determines 714 that the local voltage source is not available, then the local terminal sets 730 the local flag to zero and sets 728 the local multiplier to zero.

The local terminal then adds 732 a value proportional to the V/Hz ratio, multiplied by the local multiplier, to the local partial restraining current. As discussed above, the value added to the local partial restraining current according to one embodiment is g*(V/Hz)^2, although other values based on the V/Hz ratio may also be used. If the local multiplier is zero, then a value proportional to the V/Hz ratio is not added to the local partial restraining current. The local terminal also sends 734 the local flag and the local partial restraining current to the one or more remote terminals. Thus, each of the remote terminals can adjust its own multiplier used with its V/Hz ratio based at least in part on the local terminal's flag. As discussed above, the local terminal may also send a local partial differential current, which may have been adjusted for line charging current. The local terminal then determines 736 an overall restraining current based on each of the partial restraining currents. Thus, this voltage-based overexcitation restraint is applied without sending voltage values between the terminals of the power apparatus.

Overview of Alpha Plane for Two Terminals

As discussed above, winding currents are compensated based on their respective flows through transformer windings, and the compensated currents may be used to calculate a complex current ratio used in an alpha plane analysis to selectively determine when to trip a power apparatus that includes the transformer. The disclosure below discusses details of the alpha plane principle and a two-terminal equivalent protection zone for applying the alpha plane for a multi-terminal power apparatus. As disclosed herein, transformer differential protection using the equivalent alpha plane is provided for a power apparatus that includes a power transformer.

For a zone of protection, the alpha plane principle individually compares magnitudes and angles of currents within the zone. The alpha plane principle is naturally applied to two terminal lines in a zone of protection where the ratio of magnitudes is compared, as well as the relative angle between the two currents. In the determination of faults, a complex current ratio k is calculated and located in the alpha plane, which is a graphical representation of the vector ratio of the first current $I_1$ (e.g., remote current) to the second current $I_2$ (e.g., local current). Line current values from the first relay (e.g., remote relay) and the second relay (e.g., local relay) are combined into a ratio of current values. This ratio k has a magnitude and an angle and may be plotted on the complex current ratio plane with real and imaginary axes. It is understood that the directionality of both the currents is consistent with respect to the protected line—they are both measured into or out of the line.

Figure 8:
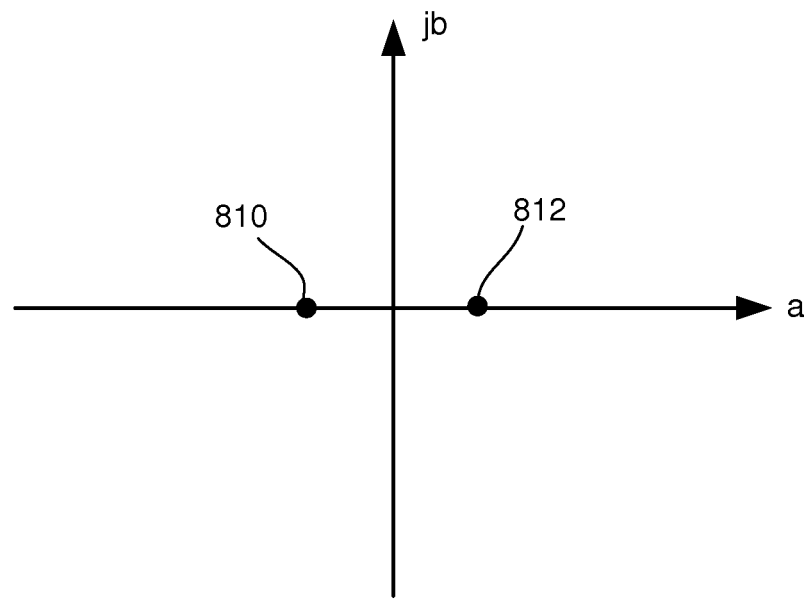
FIG. 8 is a simplified diagram of an alpha (current ratio) plane.

FIG. 8 is a simplified diagram of an alpha (current ratio) plane. The labels for the two axes of the plane, a and jb, are derived as follows:

$$k = \frac{\overline{I_1}}{\overline{I_2}} = re^{j\theta} = a + jb, \quad (6)$$

$$a = \text{Re}\left(\frac{\overline{I_1}}{\overline{I_2}}\right), \quad (7)$$

$$b = \text{Im}\left(\frac{\overline{I_1}}{\overline{I_2}}\right), \quad (8)$$

where Re and Im refer to the real and imaginary parts of the current ratio.

Ideally, through current appears in equal but opposite values at the two relays, so for load and external faults, $$k = \frac{I_1}{I_2} = 1\angle 180°, \quad (9)$$

which is represented by the point labeled 810 in FIG. 8.

With respect to internal faults, the fault current is equal at both ends of the line only when the line is homogenous and the contributions to the fault from both ends of the line are equal, e.g., when the two sources have equal strength and the fault is at the mid-point of the line. In such a case, $$k = \frac{I_1}{I_2} = 1\angle 0°. \quad (10)$$

However, as the internal fault moves toward the second (local) relay, $I_2$ will increase and point 812 in the alpha plane will move toward the origin when viewed from the second (local) relay. For large remote currents, when compared to the local current, the point will move away from the origin, as viewed from the local relay. As the fault moves away from the second (local) relay, $I_2$ will decrease and the point will move.

It should be understood that a separate alpha plane representation would exist for each of the three phase currents $I_A$, $I_B$, and $I_C$. Further, in certain embodiments, a separate alpha plane representation may be provided for zero sequence currents, negative sequence currents, positive sequence currents, or combinations of the foregoing. For example, an alpha plane representation may include a current that is a combination of a zero sequence current (e.g., 25%) and a negative sequence current (e.g., 75%).

Various system factors, including non-homogenous power systems, cause the angle of the fault current in the alpha plane at each terminal to be different, which results in the ratio point for an internal fault to move up or down in the alpha plane along an arc that moves through the "a" axis. Various other factors, including line measurement errors, line charging current, CT (current transformer) saturation effects, transient effects in the power system compensation capacitors, and other aspects of the relay system can cause the current ratio k for external faults to move away from point 810 shown in FIG. 8. For internal faults, such factors will result in the current ratio moving around on the alpha plane.

The movement from point 810 in the alpha plane for external faults (e.g., from the ideal external fault or load) complicates the line differential system's decision in (1) declaring a fault on the protected line and tripping the associated circuit breaker on the line or (2) restraining the fault declaring action because the current ratio is due to load or an external fault or to system factors and/or errors.

There is a region defined in the alpha plane that is a "restrain" (block) region and a region that is an "operate" (trip) region, to enable appropriate decision making with respect to the restrain and operate options. In the present disclosure, all of the points in the alpha plane that should not result in a trip action by the line differential element define a restrain region for which there is no trip signal, while the remaining portions in the alpha plane are in the operate region for which a trip signal is normally allowed.

Figure 9:
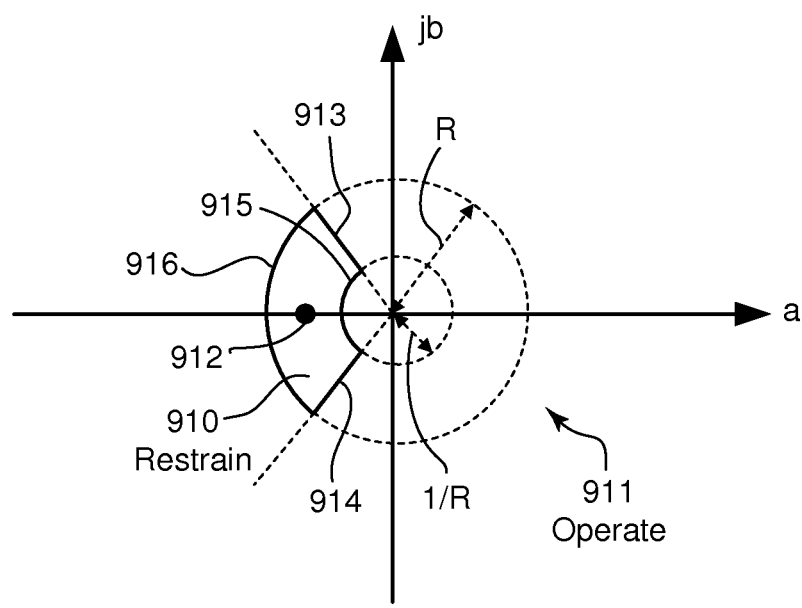
FIG. 9 graphically illustrates a restrain region and an operate region in an alpha plane used according to one embodiment for fault determination decisions.

FIG. 9 graphically illustrates a restrain region 910 and an operate region 911 in an alpha plane used according to one embodiment for fault determination decisions. For illustrative purposes, the restrain region 910 is shown as enclosed within solid lines. Again, the operate region 911 may include all points it the alpha plane that are not in the restrain region 910. The restrain region 910 in the alpha plane illustrated in FIG. 9 is placed around the ideal external fault point 912. The restrain region 910 is defined by a user-selected current ratio (blocking) angle (shown as the radial lines 913 and 914 above and below the "a" axis, the range of which accommodates current ratio values affected by various system factors, including line charging current values, CT saturation, and sample time and data alignment errors. The restrain region 910 is further defined by a user-selected magnitude of the current ratio (shown as the curved lines 915, 916), the range of which accommodates CT saturation among other factors. Generally, a user selects a radius R for the outer curved line 916, which results in the inner curve being set as 1/R. The alpha plane principle allows for shaping the restrain region 910 with more user control as compared with the traditional percentage-restrained differential principle.

Logic circuitry (not shown) may use a series of logical comparisons and other functions to determine where the current ratio k is located in the alpha plane, and specifically whether the current ratio k is within the restrain region 910, in which case there is no trip signal. When the current ratio k is outside of the restrain region 910, into the operate region 911, a trip signal is produced if the measured current values have satisfied certain threshold and other characteristics.

Multi-Terminal Alpha Plane Analysis

Being intuitive and straightforward in two-terminal applications, the alpha plane is less natural in a general N-terminal case. Complex current flow patterns can be encountered, such as a circulating current—a current leaving the zone at one terminal to re-enter it at the other. These patterns should be analyzed carefully in order to avoid a failure to trip by responding to one of the current flowing out of the zone to feed a load or circulating to the other line terminal. Many possible permutations of ratios between many possible currents would complicate understanding, implementation, testing and post event analysis of relays applying alpha plane to multiple terminals.

Thus, certain embodiments disclosed herein include a generalized N-terminal alpha plane concept. This protection method calculates a two-terminal equivalent for a general N-terminal case, and applies the alpha plane principle to two equivalent currents instead of to the multitude of the measured currents.

Figure 10:
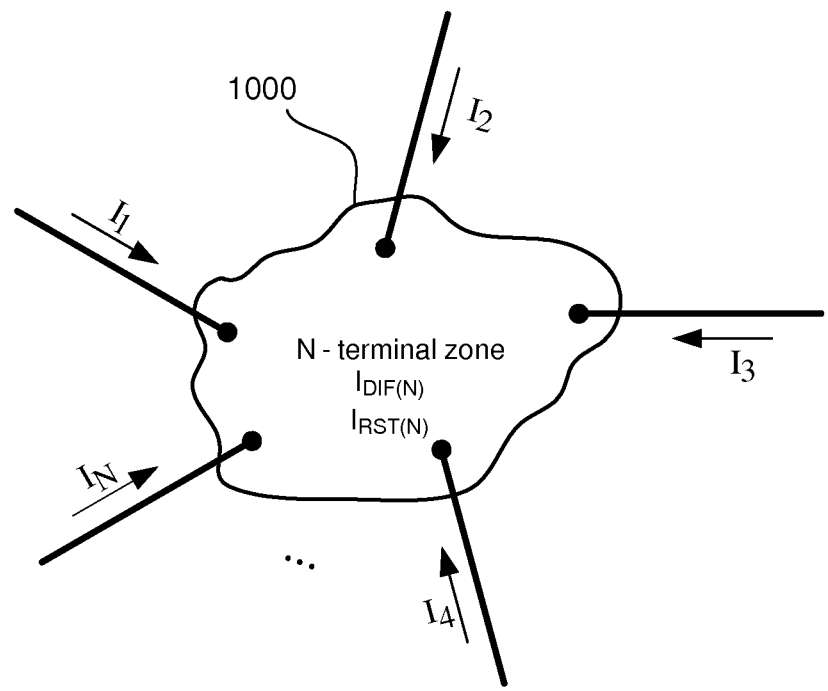
FIG. 10 schematically illustrates a general N-terminal differential zone of protection according to one embodiment.

FIG. 10 schematically illustrates a general N-terminal differential zone 1000 of protection according to one embodiment. In this example, the N-terminal zone 1000 includes currents $I_1, I_2, I_3, I_4, \ldots, I_N$ that each corresponds to a respective terminal. An artisan will recognize from the disclosure herein that any number of currents greater than one may be used for the N-terminal zone 1000. For example, if N=3 for a three terminal system, then only currents $I_1$, $I_2$, and $I_3$ would correspond to the N-terminal zone 1000. The differential principle would derive the following differential current $I_{DIF(N)}$ and restraining current $I_{RST(N)}$ for the N-terminal zone 1000:

$$I_{DIF(N)} = \sum_{k=1}^{N} I_k, \tag{11}$$

$$I_{RST(N)} = \sum_{k=1}^{N} |I_k|. \tag{12}$$

In this example embodiment, the restraining current $I_{RST(N)}$ is a summation of current amplitudes. An artisan will recognize, however, that the restraining current $I_{RST(N)}$ may be determined in a variety of different ways. As discussed above, the restraining current $I_{RST(N)}$ is used to provide a notion of the current flowing through the zone 1000. Thus, depending on the particular application, the restraining current $I_{RST(N)}$ may be defined as the maximum measured current (e.g., where the highest current corresponds to an external fault current), a summation of current amplitudes (as used in equation (12) and the example solution provided herein), a summation of currents that is divided by the total number of currents (e.g., the average current), or a product of currents.

Figure 11:
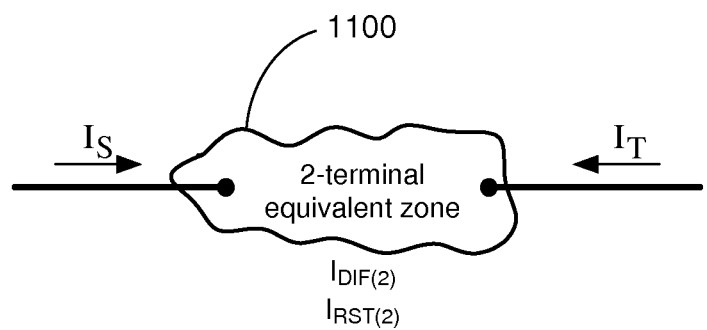
FIG. 11 schematically illustrates a two-terminal equivalent zone of protection according to one embodiment.

FIG. 11 schematically illustrates a two-terminal equivalent zone 1100 of protection according to one embodiment. As discussed above, a two-terminal zone is the natural application for the alpha plane. The two-terminal equivalent zone 1100 shown in FIG. 11 includes two virtual currents $I_S$, $I_T$ that provide an equivalent representation of the currents $I_1, I_2, I_3, I_4, \ldots, I_N$ of the N-terminal zone 1000 shown in FIG. 10. The differential principle may be applied to the two virtual currents $I_S$, $I_T$ to derive a differential current $I_{DIF(2)}$ and a restraining current $I_{RST(2)}$ for the two-terminal equivalent zone 1100.

The two virtual currents $I_S$, $I_T$ in the two-terminal equivalent zone 1100 are sought such that the same differential current and the same restraining currents are determined in the two-terminal equivalent zone 1100 as in the actual N-terminal zone 1000:

$$I_{DIF(2)} = I_{DIF(N)}, \tag{13}$$

$$I_{RST(2)} = I_{RST(N)}. \tag{14}$$

The two currents $I_S$, $I_T$ of the two-terminal equivalent have a total of four degrees of freedom (two magnitudes and two angles), while there are a total of three boundary equations: the real and imaginary parts of the differential current (equation (13)), and the magnitude of the restraining current (equation (14)). Thus, there are three equations and four unknowns.

To solve for the four unknowns according to certain embodiments, a fourth balance equation is provided (or the number of unknowns is reduced to three) by assigning an attribute from one of the N measured zone currents $I_1, I_2, I_3, I_4, \ldots, I_N$ to either one of the two equivalent currents $I_S$, $I_T$. For example, the zone current $I_1, I_2, I_3, I_4, \ldots, I_N$ with the greatest amplitude may be selected for the magnitude of one of the virtual currents $I_S$, $I_T$.

In another embodiment, the fourth balance equation calls for one of the two equivalent currents $I_S$, $I_T$ to be in phase with a specific zone current $I_P$ selected from among the N zone currents $I_1, I_2, I_3, I_4, \ldots, I_N$.

In one example embodiment, the specific zone current $I_P$ is selected as the zone current $I_1, I_2, I_3, I_4, \ldots, I_N$ that is the highest after projection on the line of the differential current $I_{DIF(N)}$. A rationale behind this choice is that during external faults with CT saturation the spurious differential signal, if significant, will be approximately located along the line of the fault current. Therefore, by selecting the reference current $I_P$ that is closest in phase to the differential current, the conversion positions the two equivalent alpha plane currents $I_S$, $I_T$ along the lines of the current flowing into and out of the zone 1000.

To select the reference current $I_P$ according to one embodiment, the following auxiliary numbers $R_k$ are calculated first:

$$R_k = |\text{real}(I_k \cdot I^*_{DN})|, k=1 \ldots N, \tag{15}$$

wherein $I^*_{DN}$ represents the complex conjugate of the differential current $I_{DIF(N)}$ of the N-terminal zone 1000.

The current with the highest value of R becomes the reference current $I_P$. Denoting the angle of this current as β:

$$\beta = \text{angle}(I_P). \tag{16}$$

The differential current $I_{DIF(N)}$ is shifted for the convenience of subsequent calculations as follows:

$$I_X = I_{DIF(N)} \cdot 1\angle(-\beta). \tag{17}$$

The two currents $I_S$, $I_T$ of the two-terminal equivalent zone 1100 are now calculated as follows:

$$I_T = \left( \frac{\text{Im}(I_X)^2 - (I_{RST(N)} - \text{Re}(I_X))^2}{2 \cdot (I_{RST(N)} - \text{Re}(I_X))} + j \cdot \text{Im}(I_X) \right) \cdot 1\angle\beta, \tag{18}$$

$$I_S = (I_{RST(N)} - |I_T|) \cdot 1\angle\beta. \tag{19}$$

The two-terminal alpha plane protection principle takes over from here, working with the $I_S$ and $I_T$ currents. Thus, $I_S$ and $I_T$ may be used to calculate the complex current ratio k as:

$$\frac{I_S}{I_T} = k = k_{mag} \angle \alpha. \tag{20}$$

One application of the process discussed above is to convert a multi-terminal power apparatus that includes three or more terminals into an equivalent two-terminal power apparatus for use with the alpha plane. An artisan will recognize from the disclosure herein that the method may also be used for a two-terminal power apparatus. In other words, the same process may be used for a two-terminal power apparatus and a power apparatus that has three or more terminals. When the above equations are applied to a two-terminal power apparatus having a first measured current $I_1$ and a second measured current $I_2$, for example, the result is that the equivalent currents $I_S$, $I_T$ respectively equal the measured currents $I_1$, $I_2$.

The differential principle has been used in the method discussed above as a mathematical mapping tool to project the general case of the N-terminal differential zone 1000 into the equivalent two-terminal zone 1100, requiring the differential current $I_{DIF(N)}$ and the restraining current $I_{RST(N)}$ to be identical between the N-terminal application and its two-terminal equivalent. The method may be applied to phase, negative sequence, and/or ground differential elements with filtered differential and restraint currents from partial terms communicated between the various relays of the N-terminal system.

Figure 12A:
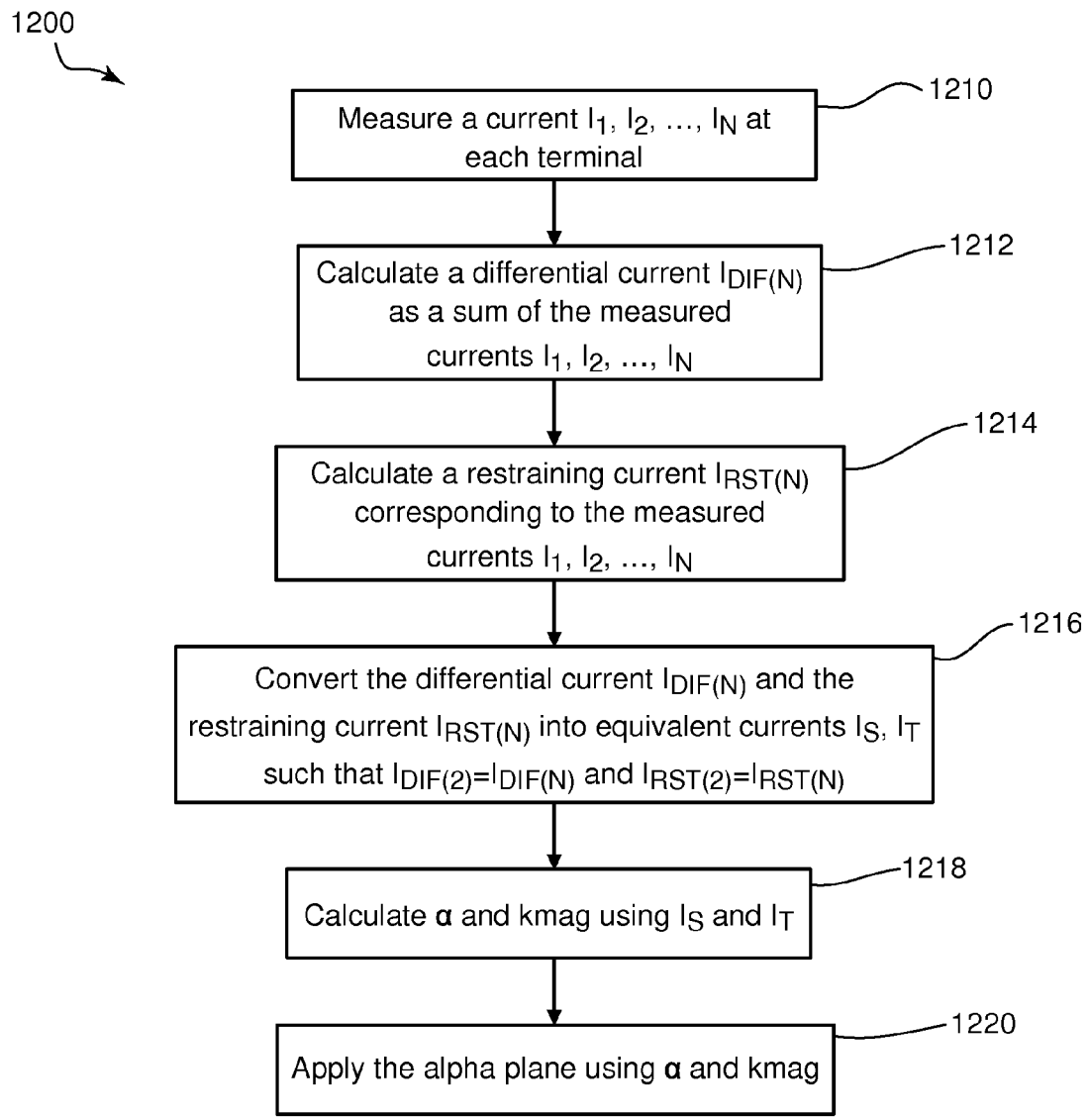
FIG. 12A is a flow diagram of a method for current differential protection of a multi-terminal power apparatus according to one embodiment.

FIG. 12A is a flow diagram of a method 1200 for current differential protection of a multi-terminal power apparatus according to one embodiment. The method 1200 includes measuring 1210 a current $I_1, I_2, \ldots, I_N$ at each terminal, respectively. The method 1200 also includes calculating 1212 a differential current $I_{DIF(N)}$ as a sum of the measured currents $I_1, I_2, \ldots, I_N$, and calculating 1214 a restraining current $I_{RST(N)}$ corresponding to the currents $I_1, I_2, \ldots, I_N$. As discussed above, in one embodiment, the restraining current $I_{RST(N)}$ is calculated as a sum of the absolute values (amplitudes) of the measured currents $I_1, I_2, \ldots, I_N$. Then, the method 1200 includes converting 1216 the differential current $I_{DIF(N)}$ and the restraining current $I_{RST(N)}$ into equivalent currents $I_S$, $I_T$ such that $I_{DIF(2)} = I_{DIF(N)}$ and $I_{RST(2)} = I_{DIF(N)}$. As discussed in detail below, in some embodiments the differential current $I_{DIF(N)}$ and/or the restraining current $I_{RST(N)}$ may be intentionally augmented before being converted 1216 to the equivalent currents $I_S$, $I_T$. The augmentation may be based on a physical condition of the multi-terminal power apparatus. The method 1200 further includes calculating 1218 a and $k_{mag}$ using the equivalent currents $I_S$, $I_T$ (see equation (20) above), and applying 1220 the alpha plane using a and $k_{mag}$.

Figure 12B:
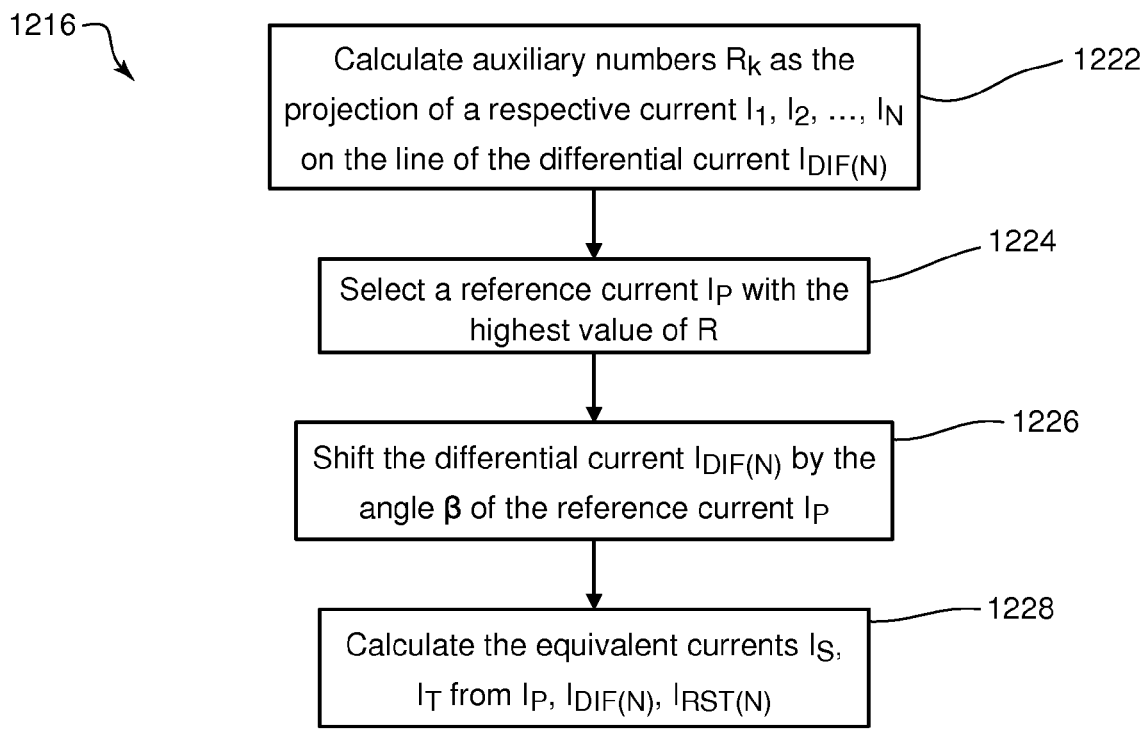
FIG. 12B is a flow diagram of a method for converting a differential current and a restraining current into the equivalent currents according to one embodiment.

FIG. 12B is a flow diagram of a method 1216 for converting the differential current $I_{DIF(N)}$ and the restraining current $I_{RST(N)}$ into the equivalent currents $I_S$, $I_T$ according to one embodiment. The method 1216 includes calculating 1222 auxiliary numbers $R_k$ as the projection of a respective current $I_1, I_2, \ldots, I_N$ on the line of the differential current $I_{DIF(N)}$, selecting 1224 a reference current $I_P$ as the current corresponding to the highest value of R, shifting 1226 the differential current $I_{DIF(N)}$ by the angle $\beta$ of the reference current $I_P$, and calculating 1228 the equivalent currents $I_S$, $I_T$ from $I_P$, $I_{DIF(N)}$, and $I_{RST(N)}$.

The generalized alpha plane allows implementation of the two-terminal principle to multi-terminal lines, retaining advantages while enabling new applications. Note the following:

(1) As discussed above, the generalized principle is transparent in two-terminal applications. In other words, the two equivalent currents equal the two actual currents.

(2) Any case with a balanced differential current and non-zero restraining current yields an ideal blocking point on the alpha plane ($1 \angle 180°$). Decreasing the differential current, such as by line charging current compensation, brings the alpha plane point closer to the ideal blocking position.

(3) Any case with higher restraining current under a given differential current brings the alpha plane point closer to the ideal blocking point. The method allows applications where the restraint term is artificially increased such as when using harmonic restraint in transformer protection.

(4) The principle works well without the need to communicate all local currents individually from all terminals. The partial differential and restraint terms map well into the generalized alpha plane.

(5) The principle works well during external fault under CT saturation. First, by relying on the true restraint term, the calculated alpha plane point shows a strong blocking tendency. Second, extra security is added by the nature of the alpha plane itself.

(6) The principle works very well for elements that implement ground (e.g., 87LG) and negative-sequence (e.g., 87LQ) differential functions. Under internal faults, the elements' currents are close in phase, and differ only by the system non-homogeneity angles. The generalized alpha plane returns a strong unblocking indication in this case regardless of the magnitudes of the compared currents. Under external faults, including faults that do not produce any natural restraint (phase to phase faults for the 87LG, for example), a cross phase restraint may be used upon detecting an external fault by other elements of the logic circuit, such as an external fault detector (EFD). With increased restraint, the equivalent alpha plane point shifts safely toward blocking.

(7) By reducing a differential zone of protection with any number of terminals to a single operating point on the alpha plane, the principle simplifies implementation, testing, and post event analysis.

An artisan will recognize other advantages from the embodiments disclosed herein.

Examples of Multi-Terminal Alpha Plane

The following numerical embodiments of multi-terminal alpha plane analysis are provided by way of example only, and not by limitation. An artisan will recognize from the disclosure herein that any current values may be used and/or that any number of terminals may be used, including two terminals. Further, the numbers used in these examples may be approximations.

Figure 13A:
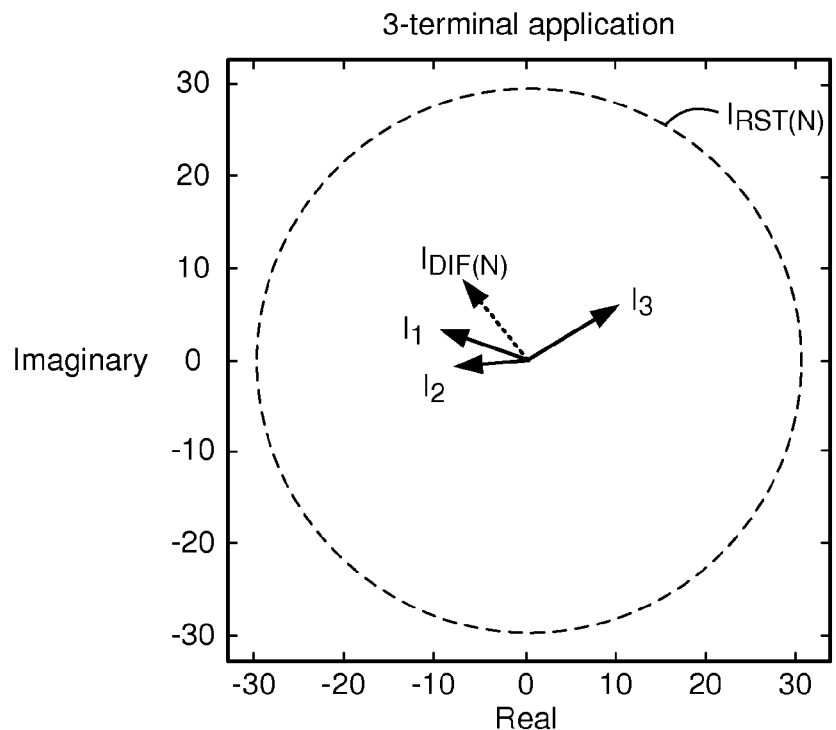
FIG. 13A graphically illustrates an alpha plane for a three-terminal application (N=3) according to one example embodiment.

FIG. 13A graphically illustrates an alpha plane for a three-terminal application (N=3) according to one example embodiment. In this example, the three currents $I_1, I_2, I_3$ measured at the three respective terminals are:

$I_1 = 10.0 \, A \angle 160°$, $I_2 = 8.0 \, A \angle -175°$, $I_3 = 12.0 \, A \angle 30°$.

The three measured currents $I_1, I_2, I_3$ are plotted on the alpha plane shown in FIG. 13A. Using equation (11), the differential current $I_{DIF(N)} = 11.2 \, A \angle 128°$. Using equation (12), the restraining current $I_{RST(N)} = 30.0$. The measured currents $I_1, I_2, I_3$ are shown as solid lines in FIG. 13A. While the differential current $I_{DIF(N)}$ and the restraining current $I_{RST(N)}$ are not generally shown on the alpha plane, for illustrative purposes, the differential current $I_{DIF(N)}$ is shown as a dashed line and the restraining current $I_{RST(N)}$ is shown as a dashed circle in FIG. 13A.

Following the methods discussed above and illustrated in FIGS. 12A and 12B, equation (15) provides the auxiliary numbers $R_k$ as:

$R_1 = 97.37 \, A^2$, $R_2 = 49.50 \, A^2$, $R_3 = 20.14 \, A^2$.

Because $R_1$ is the largest of the three auxiliary numbers, the corresponding first current $I_1$ is selected as the reference current $I_P=10.0$ A∠160°. This means that one of the equivalent currents will be located on the line of 160° or −20°.

Solving equations (17), (18), and (19) for the two-current equivalent provides:

$$I_T=11.1 A\angle 11.7° \text{ and}$$

$$I_S=18.9 A\angle 160°.$$

Figure 13B:
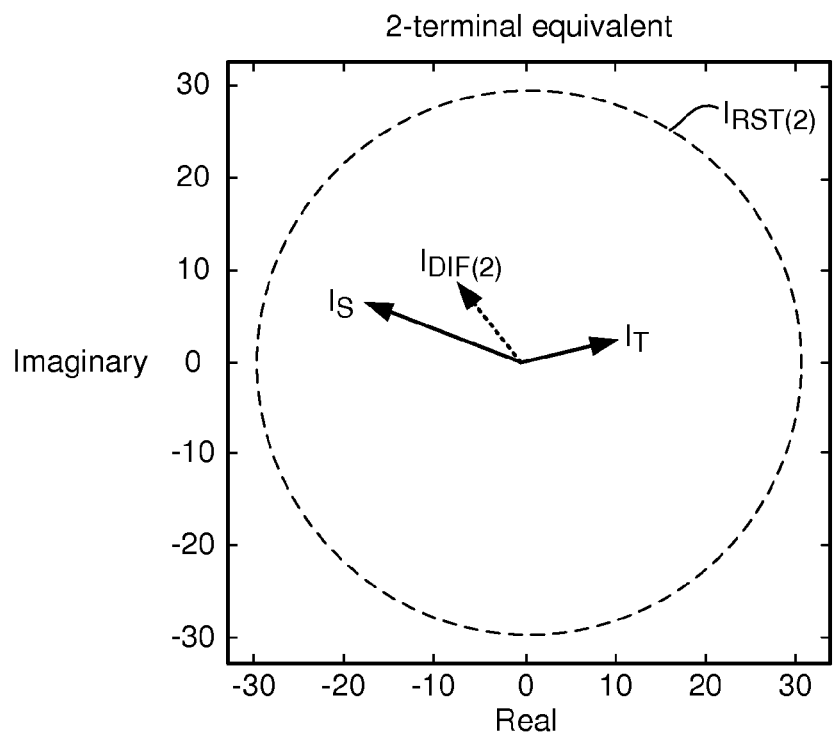
FIG. 13B graphically illustrates an alpha plane for the two-terminal equivalent of the embodiment shown in FIG. 13A according to one embodiment.

FIG. 13B graphically illustrates an alpha plane for the two-terminal equivalent of the embodiment shown in FIG. 13A according to one embodiment. Using equation (11), the equivalent differential current $I_{DIF(2)}=11.2$ A∠128°. Using equation (12), the equivalent restraining current $I_{RST(2)}=30.0$. The equivalent currents $I_S$, $I_T$ are shown as solid lines in FIG. 13B. For illustrative purposes, the equivalent differential current $I_{DIF(2)}$ is shown as a dashed line and the equivalent restraining current $I_{RST(2)}$ is shown as a dashed circle in FIG. 13B. Note that when calculated for this two-terminal equivalent, the equivalent differential current $I_{DIFF(2)}$ and the equivalent restraining current is $I_{RST(2)}$ are the same as those calculated in the original three-terminal system.

Using equation (20), the two equivalent currents $I_S$, $I_T$ give the operating point on the alpha plane of k=1.71∠148.3°, which is not shown in FIGS. 13A and 13B. Because this example does not include the limits of a restrain region, it is not determined whether this operating point k would result in assertion of a tripping signal. If the operating point k is outside the restrain region, however, the alpha plane in FIG. 13A indicates that this is likely the result of an external fault because the third current $I_3$ is near 180° from the sum of the first and second currents $I_1$, $I_2$. Similarly, FIG. 13B indicates that a fault condition would be an external fault because the phase difference between the equivalent currents $I_S$, $I_T$ is close to 180° and the ratio of magnitudes is not far from 1.

Figure 14A:
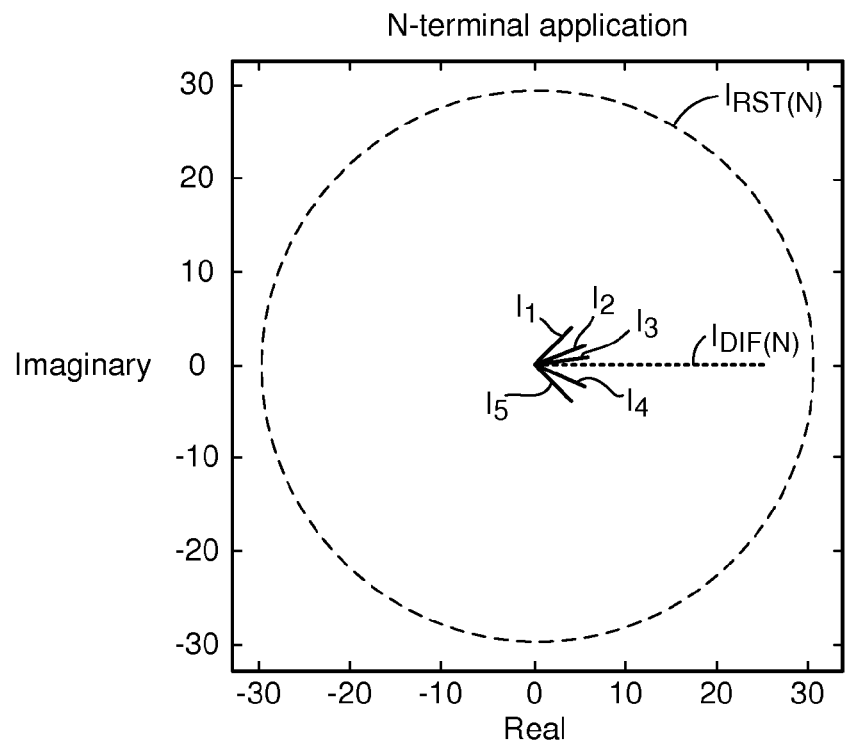
FIGS. 14A and 14B graphically illustrate respective alpha planes for the case of an internal fault according to one embodiment.
Figure 14B:
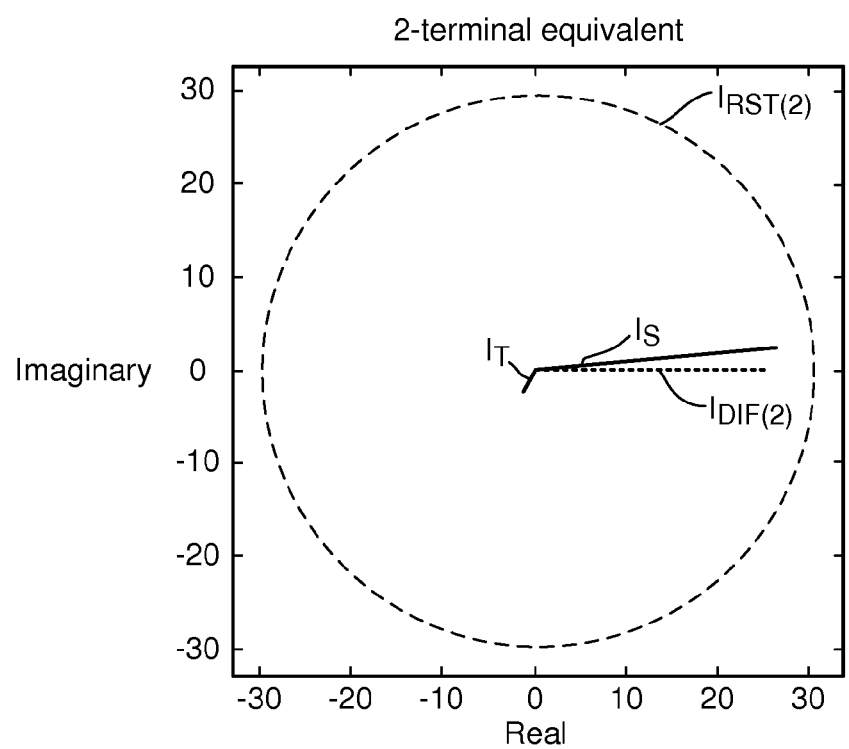

By way of contrast with the example shown in FIGS. 13A and 13B, FIGS. 14A and 14B graphically illustrate respective alpha planes for the case of an internal fault according to one embodiment. FIG. 14A illustrates the alpha plane for a five-terminal power apparatus where the five measured currents $I_1$, $I_2$, $I_3$, $I_4$, $I_5$ are approximately equal in magnitude but flow in the same general direction with some limited angle dispersion, which indicates an internal fault. FIG. 14B illustrates the alpha plane for the two-terminal equivalent of the embodiment shown in FIG. 14A. A large difference between the magnitudes of the equivalent currents $I_S$, $I_T$ (as shown in FIG. 14B) indicates the internal fault, which results in asserting a trip signal.

The examples shown in FIGS. 13A, 13B, 14A, and 14B are static in that they represent currents measured at a particular point in time. The next example is dynamic in that it illustrates changes in current over time. In this example, dual-breaker terminals are used. Modern line protection relays may support two three-phase sets of current inputs and measure the two currents independently facilitating applications to lines terminated via two circuit breakers. Such an integrated protection package works with the internally summed current for the main protection function—distance, ground directional overcurrent in a pilot-assisted scheme, or the line current differential. At the same time it provides for two independent breaker failure functions, two independent auto-reclosers, metering, recording and time coordinated backup all responding to the individual breaker currents.

Figure 15:
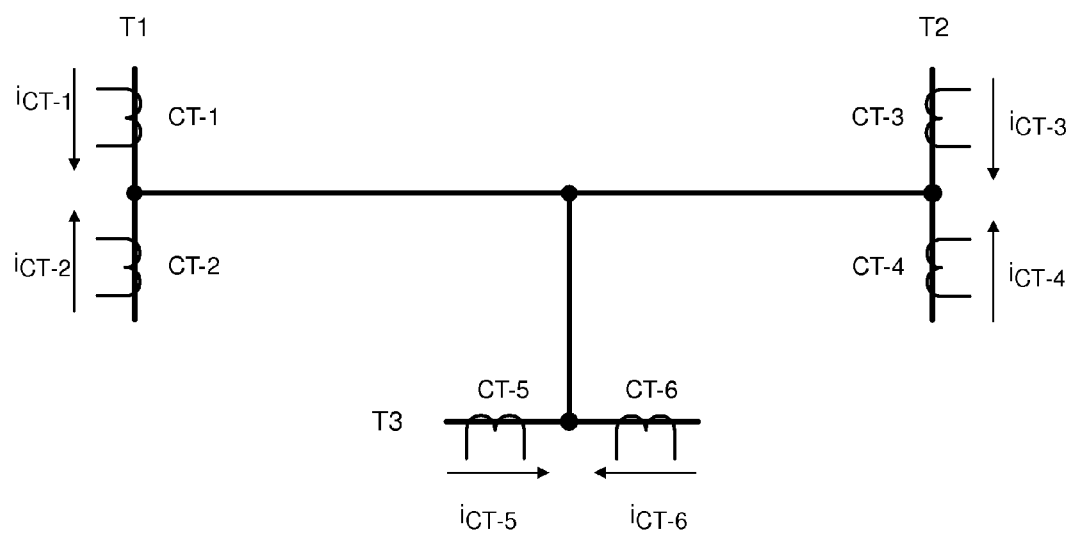
FIG. 15 schematically illustrates a three-terminal dual-breaker line configuration according to one embodiment.
Figure 16:
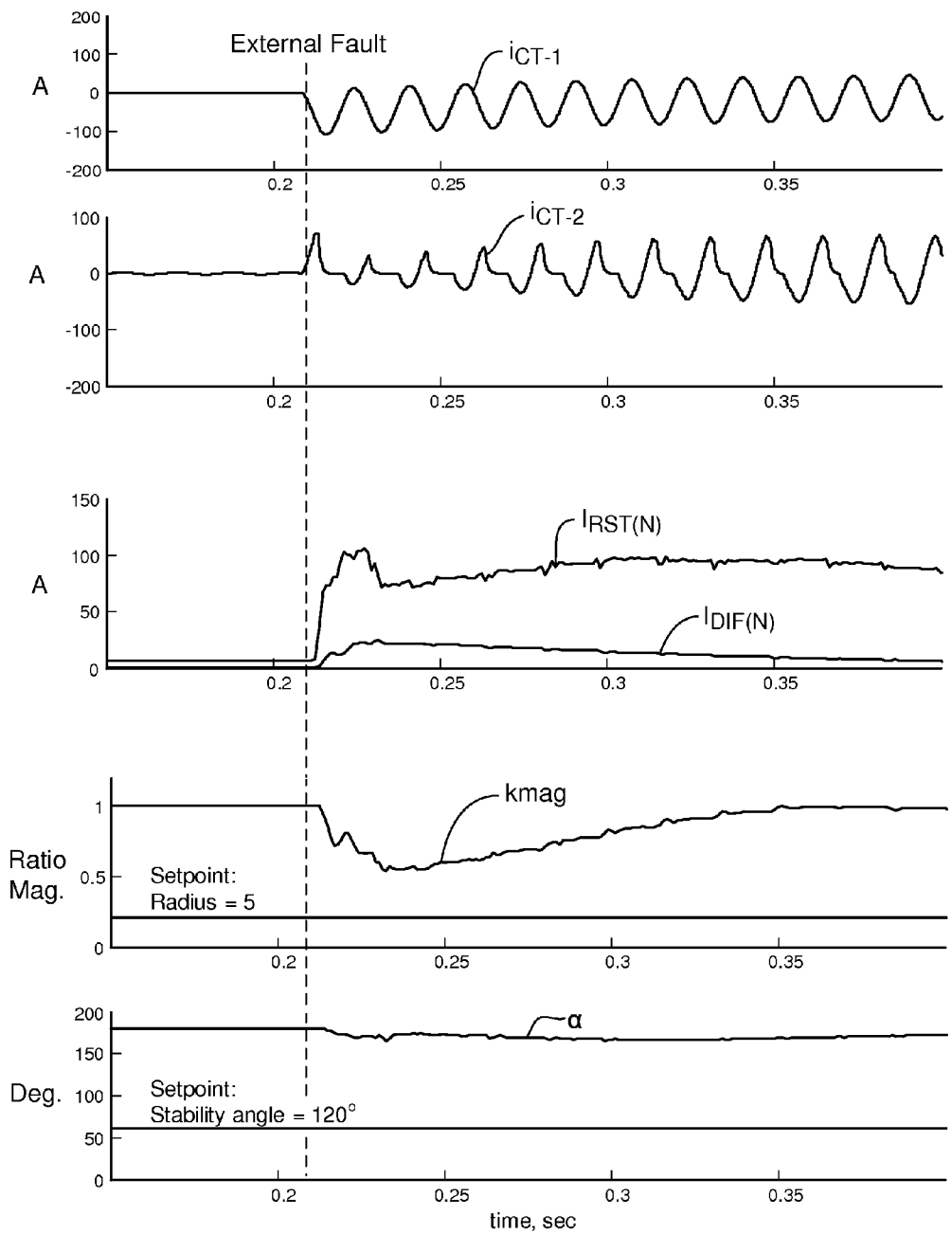
FIG. 16 illustrates plots of various signals during an external AB fault in the configuration shown in FIG. 15 according to one embodiment.

FIG. 15 schematically illustrates a three-terminal dual-breaker line configuration according to one embodiment. A first terminal T1 includes two breakers with associated current transformers CT-1, CT-2 measuring currents $i_{CT-1}$, $i_{CT-2}$. A second terminal includes two breakers with associated current transformers CT-3, CT-4 measuring currents $i_{CT-3}$, $i_{CT-4}$. A third terminal includes two breakers with associated current transformers CT-5, CT-6 measuring currents $i_{CT-5}$, $i_{CT-6}$. FIG. 16 illustrates plots of various signals during an external AB fault in the configuration shown in FIG. 15 according to one embodiment. Each signal is plotted with respect to time. The top plot shows the internal current $i_{CT-1}$ of the first terminal T1. The next plot shows the internal current $i_{CT-2}$ of the first terminal T1. The next plot shows the differential current $I_{DIF(N)}$ and the restraint current $I_{RST(N)}$. The bottom two plots show the magnitude $k_{mag}$ and the angle a, respectively, of the equivalent alpha plane. As shown, shortly after the beginning of the external fault the equivalent alpha plane yields an operating point of about 0.5∠170°, which is (correctly) within a typical blocking region of the alpha plane. Note that in this case the reference current $I_P$ is selected with some approximation as the line current differential system may not work directly with the individual currents at the faulted terminal but with partial differential and restrain terms explained below and related to the sums $i_{CT-1}+i_{CT-2}$, $i_{CT-3}+i_{CT-4}$, and $i_{CT-5}+i_{CT-6}$. Still, the large restraint term compared with the spurious differential keeps the equivalent alpha plane in the blocking region.

Examples of Transformer Differential Protection Using the Two-Terminal Equivalent Alpha Plane The following embodiments of transformer differential protection using the two-terminal equivalent alpha plane discussed above are provided by way of example only, and not by limitation. An artisan will recognize from the disclosure herein that any type of transformer used for transmitting power may be protected by the embodiments disclosed herein. An artisan will also recognize from the disclosure herein that the embodiments herein may be applied to any type of power apparatus that includes a transformer.

Figure 17:
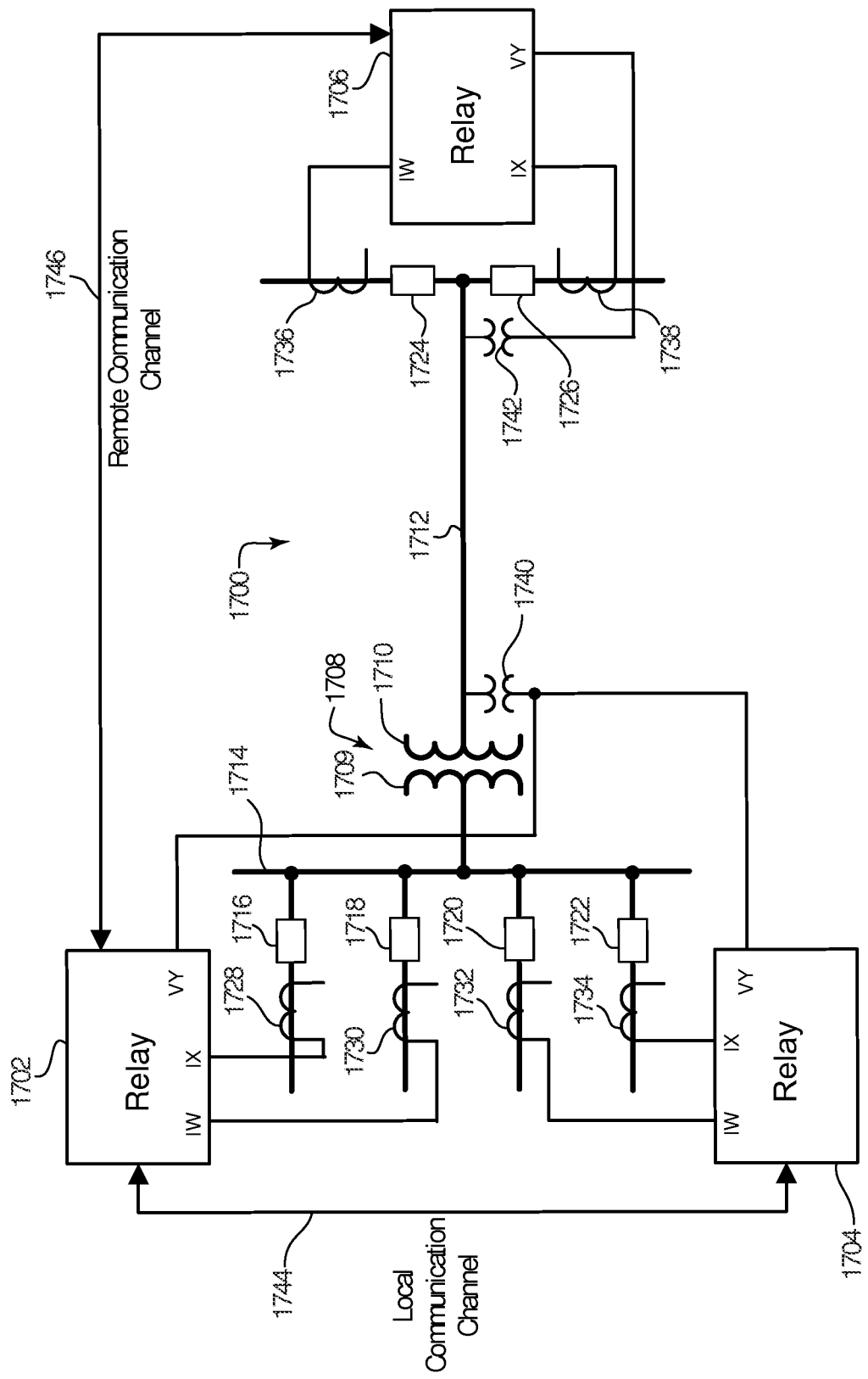
FIG. 17 is a block diagram of a power apparatus that includes a two-winding transformer connected in-line between a transmission line and a bus according to one embodiment.

FIG. 17 is a block diagram of a power apparatus 1700 that includes a two-winding transformer 1708 connected between a transmission line 1712 and a bus 1714 according to one embodiment. The transformer 1708 includes a first set of windings 1709 connected to the bus 1714 and a second set of windings 1710 connected to the transmission line 1710. In this example embodiment, differential protection is provided by a first relay 1702, a second relay 1704, a third relay 1706, a plurality of breakers 1716, 1718, 1720, 1720, a plurality of current transformers (CTs) 1728, 1730, 1732, 1734, 1736, 1738, and two voltage transformers (VTs) 1740, 1742. Each relay 1702, 1704, 1706 in this example receives two local current measurements (through inputs IW and IX) and a local voltage measurement (through input VY).

At a first end of the power apparatus 1700, the first relay 1702 measures two sets of winding currents (each set corresponding to three phases) passing through the respective breakers 1716, 1718 connected to the bus 1714 using the CTs 1728, 1730. Similarly, the second relay 1704 measures two sets of winding currents passing through the respective breakers 1720, 1722 connected to the bus 1714 using the CTs 1732, 1734. The first relay 1702 and the second relay 1704 both measure a voltage at a first end of the transmission line 1712 (connected to the second set of windings 1710) using the VT 1740.

A second end of the transmission line 1712 is terminated in a dual-breaker terminal that includes the breakers 1724, 1726. The third relay 1706 measures two sets of winding currents passing through the respective breakers 1724, 1726 using the CTs 1736, 1738. The third relay 1706 also measures a voltage at the second end of the transmission line 1712 using the VT 1740.

In this example, the first relay 1702 and the second relay 1704 are located in the same (local) substation, and the third relay 1706 is located at a remote location. An artisan will recognize from the disclosure herein, however, that the first and second relays 1702, 1704 may be combined into a single relay (configured to measure at least four currents) within the local substation. As shown in FIG. 17, however, the first and second relays 1702, 1704 communicate with each other through a local communication channel 1744, and the first and third relays 1702, 1706 communicate with each other through a remote communication channel 1746. In such an embodiment, the first relay 1702 may operate in a master mode and the second and third relays 1704, 1706 may operate is a slave mode to reduce the number of remote communication channels used (e.g., a remote relay channel is not directly needed between the second relay 1704 and the third relay 1706).

The first relay 1702 compensates the set of winding currents measured by the CT 1728 and the set of winding currents measured by the CT 1730 to calculate first partial differential currents and first partial restraining currents (e.g., as discussed above with respect to equations (1), (2), (3), and (4)). The two CTs 1728, 1730 may have different winding ratios, which results in different taps being used being used for compensation. Thus, in one embodiment, the first relay compensates both sets of winding currents (e.g., measured respectively by the CT 1728 and the CT 1730) individually (e.g., using equations (1)-(4)), and then sums the results to obtain the first partial differential currents and the first partial restraining currents. In other embodiments where the CTs 1728, 1730 have the same ratio, their currents may be summed before applying the compensation. The first relay 1702 may subtract a line charging current from the first partial differential currents, and may augment the first partial restraining currents based on magnetizing inrush restraint and/or stationary overexcitation restraint.

Similarly, the second relay 1704 compensates the set of winding currents measured by the CT 1732 and the set of winding currents measured by the CT 1734 to calculate second partial differential currents and second partial restraining currents, and performs line current compensation, magnetizing inrush restraint, and stationary overexcitation restraint. Further, the third relay 1706 compensates the set of winding currents measured by the CT 1736 and the set of winding currents measured by the CT 17338 to calculate third partial differential currents and third partial restraining currents, and performs line current compensation, magnetizing inrush restraint, and stationary overexcitation restraint. As discussed above, in one embodiment, the stationary overexcitation restraint may be based on determining a V/Hz ratio, where the voltage is determined using the VTs 1740, 1742.

As discussed herein, the relays 1702, 1704, 1706 exchange their respective partial differential and partial restraining currents. Thus, for each phase, each relay 1702, 1704, 1706 has a first partial differential and partial restraining current, a second partial differential and partial restraining current, and a third partial differential and partial restraining current. Accordingly, because the compensation has accounted for the transformer windings, the partial differential and partial restraining currents may be treated as currents corresponding to a three-terminal (N=3) power apparatus. Thus, each relay 1702, 1704, 1706 performs the operations discussed above to convert from the currents of the three-terminal power apparatus to a first equivalent current and a second equivalent current of a two-terminal equivalent power apparatus. Each relay 1702, 1704, 1706 then uses an alpha plane analysis based on a ratio of the first and second equivalent currents to determine when to trip the power apparatus 1700.

In this example embodiment, each relay 1702, 1704, 1706 compensates two sets of currents to derive three sets of partial differential and restraining currents. In other embodiments, however, each of the six sets of currents measured by the six CTs 1728, 1730, 1732, 1734, 1736, 1738 may be compensated separately to derive six sets of partial differential and restraining currents. In such an embodiment, the partial differential and partial restraining currents may be treated as currents corresponding to a six-terminal (N=6) power apparatus, and the operations discussed above performed to convert from the currents of the six-terminal power apparatus to a first equivalent current and a second equivalent current of a two-terminal equivalent power apparatus.

Figure 18:
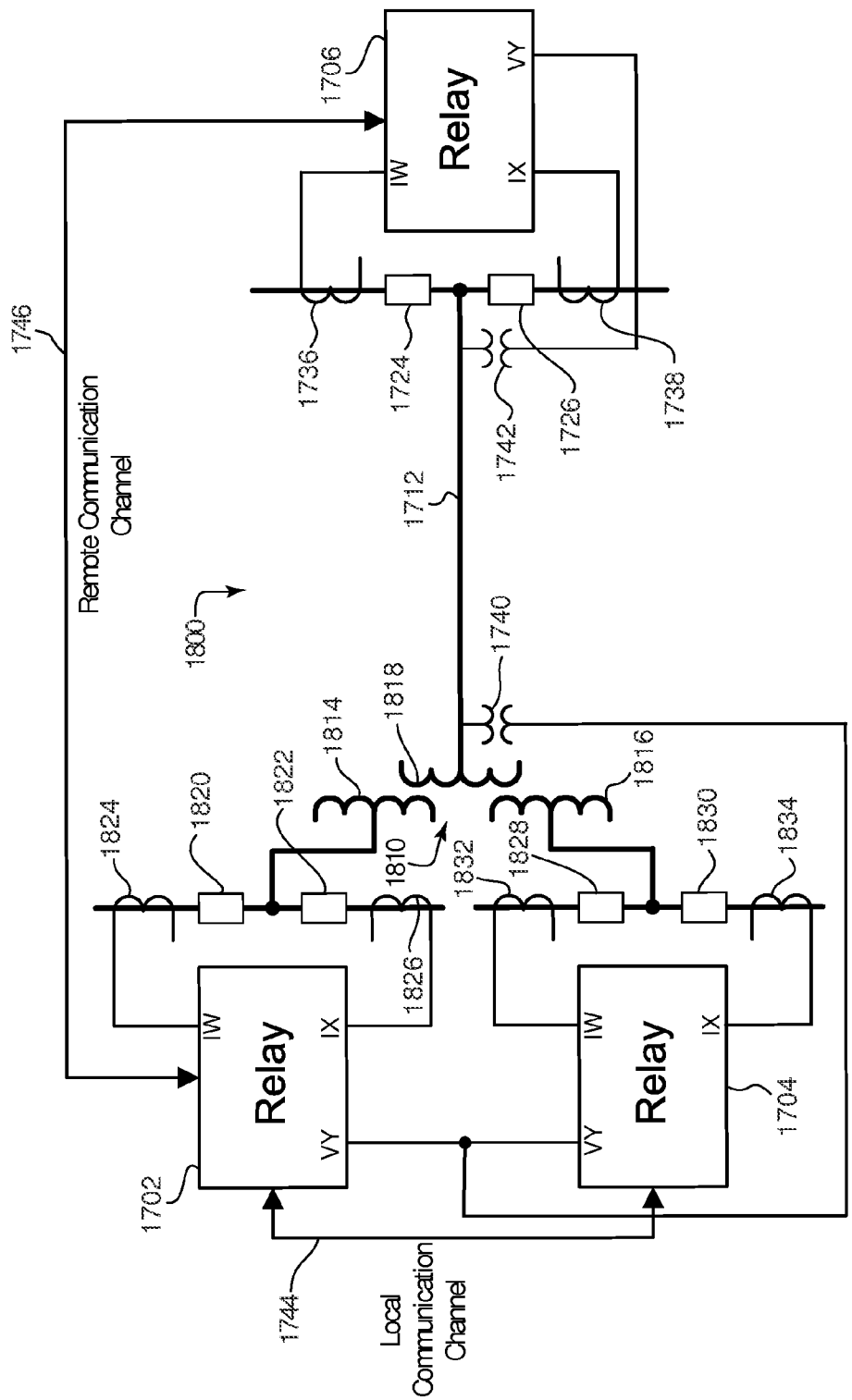
FIG. 18 is a block diagram of a power apparatus that includes a three-winding transformer connected in-line to a transmission line according to one embodiment.

FIG. 18 is a block diagram of a power apparatus 1800 that includes a three-winding transformer 1810 connected in-line to a transmission line 1712 according to one embodiment. The transformer 1810 in this example embodiment includes a first set of windings 1814 connected to a dual-breaker terminal controlled by the first relay 1702, a second set of windings 1816 connected to a dual-breaker terminal controlled by the second relay 1704, and a third set of windings 1818 connected to a first end of the transmission line 1712. The dual-breaker terminals controlled by the first and second relays 1702, 1704 may be located in the same substation. As discussed above with respect to FIG. 17, a second end of the transmission line 1712 terminates in a dual-breaker terminal controlled by the third relay 1706. The dual-breaker terminal controlled by the first relay includes two breakers 1822, 1824 and two CTs 1824, 1826. The dual-breaker terminal controlled by the second relay includes two breakers 1828, 1830 and two CTs 1832, 1834.

Each relay 1702, 1704, 1706 shown in FIG. 18 compensates two sets of currents (measured by its respective CTs), performs line charging current compensation, magnetizing inrush restraint, and/or stationary overexcitation restraint, and exchanges its partial differential and partial restraining currents with the other terminals. Thus, each relay 1702, 1704, 1706 has three sets of partial differential and partial restraining currents. Each relay 1702, 1704, 1706 also converts the three partial differential and restraining currents to first and second equivalent currents, and performs an alpha plane analysis using the first and second equivalent currents.

Figure 19:
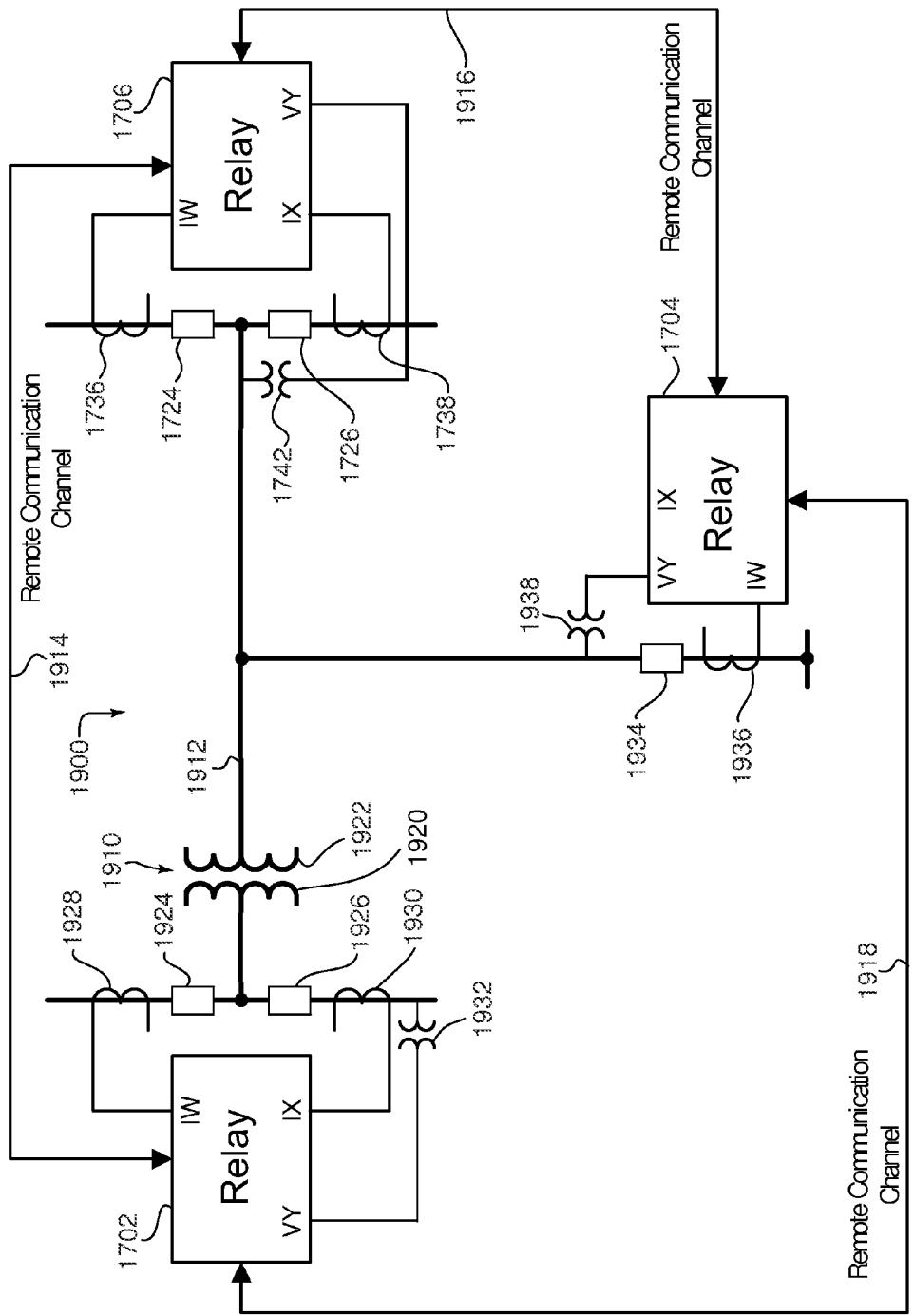
FIG. 19 is a block diagram of a power apparatus that includes a two-winding transformer and a tapped transmission line according to one embodiment.

FIG. 19 is a block diagram of a power apparatus 1900 that includes a two-winding transformer 1910 and a tapped transmission line 1912 according to one embodiment. In this example embodiment, each two line ends are terminated in a dual-breaker connection and a third line end is terminated in a single-breaker connection. Each terminal shown in FIG. 18 may be located, for example, in a different substation of a power distribution system. Thus, the example embodiment shown in FIG. 19 includes remote communication channels 1914, 1916, 1918 between each of the relays 1702, 1704, 1706.

The transformer 1910 in this example embodiment includes a first set of windings 1920 connected to a dual-breaker terminal controlled by the first relay 1702, and a second set of windings 1922 connected to both a single-breaker terminal controlled by the second relay 1704 and the dual-breaker terminal controlled by the third relay 1706, as discussed above. The dual-breaker terminal controlled by the first relay includes two breakers 1924, 1926 and two CTs 1928, 1930. The first relay 1702 measures a voltage of the dual-breaker termination using a VT 1932. The single-breaker terminal controlled by the second relay 1704 includes a breaker 1934 and a CT 1936. The second relay 1704 measures a line voltage using a VT 1938.

Each of the first and third relays 1702, 1706 shown in FIG. 19 compensates two sets of currents (measured by its respective CTs), and the second relay 1704 compensates a single set of currents measured by the CT 1936. Each relay 1702, 1704, 1706 performs line charging current compensation, magnetizing inrush restraint, and/or stationary overexcitation restraint, and exchanges its partial differential and partial restraining currents with the other terminals. Thus, each relay 1702, 1704, 1706 has three sets of partial differential and partial restraining currents. Each relay 1702, 1704, 1706 also converts the three partial differential and restraining currents to first and second equivalent currents, and performs an alpha plane analysis using the first and second equivalent currents.

The above examples illustrate that single and/or dual CT input relays capable of multi-terminal applications may be used to provide protection for many different combinations of lines, transformers, buses, and/or other elements of a power system.

It will be understood by those having skill in the art that many changes may be made to the details of the above-described embodiments without departing from the underlying principles of the invention. The scope of the present invention should, therefore, be determined only by the following claims.

The invention claimed is:

1. A method for transformer differential protection, the method comprising:
   measuring a plurality of currents corresponding to a first set of windings of a transformer and a second set of windings of the transformer;
   compensating the plurality of measured currents based on their respective flows through either the first set of windings or the second set of windings, wherein the compensation is based on a model of an ideal current node, the model having equal current flow into and out of the current node under fault-free operation;
   calculating a differential current comprising a sum of the compensated currents;
   calculating a restraining current corresponding to the compensated currents;
   augmenting the restraining current by adding a value to the restraining current, the value based on at least one of a magnetizing inrush current and overexcitation of the transformer;
   calculating a complex current ratio corresponding to the plurality of compensated currents;
   applying an alpha plane analysis to the complex current ratio; and
   selectively tripping, based on the alpha plane analysis, a power apparatus that includes the transformer.

2. The method of claim 1, wherein compensating the plurality of measured currents comprises:
   performing ratio matching based on transformation ratios of the transformer and a connected current transformer; and
   performing zero-sequence removal and vector group compensation.

3. The method of claim 1, wherein augmenting the restraining current comprises:
   determining at least one harmonic of the differential current; and
   adding the at least one harmonic to the restraining current terms using one or more selected multipliers.

4. The method of claim 3, wherein augmenting the restraining current based on the magnetizing inrush current associated with the transformer comprises:
   adding a magnitude of at least one of a second and a fourth harmonic of the differential current to the restraining current using the one or more selected multipliers.

5. The method of claim 3, wherein augmenting the restraining current based on the overexcitation of the transformer comprises:
   adding a magnitude of a fifth harmonic of the differential current to the restraining current using the one or more selected multipliers.

6. The method of claim 1, augmenting the restraining current based on the overexcitation of the transformer comprises:
   determining a voltage and a frequency applied to the transformer;
   calculating a volts per hertz (V/Hz) ratio based on the determined voltage and frequency applied to the transformer;
   comparing the V/Hz ratio to a threshold value; and
   in response to the comparison, selectively augmenting the restraining current by adding a value based on the V/Hz ratio to the restraining current.

7. The method of claim 6, wherein determining the voltage comprises:
   measuring a local voltage at a local terminal;
   measuring a local current at the local terminal; and
   calculating a remote voltage corresponding to a remote terminal where the transformer is located, the remote voltage being about equal to the measured local voltage minus a product of the measured local current and an impedance of a transmission line between the local terminal and the remote terminal.

8. The method of claim 1, wherein the transformer is an in-line transformer of the power apparatus, wherein the power apparatus comprises a transmission line electrically connected to one of the sets of windings of the in-line transformer, the method further comprising:
   determining a line charging current; and
   subtracting the determined line charging current from the differential current.

9. The method of claim 1, wherein calculating the complex current ratio comprises:
   converting the differential current and the restraining current into a first equivalent current of an equivalent two-terminal power apparatus and a second equivalent current of the equivalent two-terminal power apparatus,
     wherein a sum of the first equivalent current and the second equivalent current substantially equals the calculated differential current corresponding to the compensated currents, and
     wherein values of the first equivalent current and the second equivalent current substantially yield the calculated restraining current corresponding to the compensated currents; and
   calculating a complex ratio of the first equivalent current and the second equivalent current.

10. The method of claim 9, wherein applying the alpha plane analysis comprises:
   calculating a magnitude value of the complex ratio of the first equivalent current and the second equivalent current;
   calculating an angle difference value between the first equivalent current and the second equivalent current; and comparing the ratio magnitude value and the angle difference value against preselected values that establish a phase region in a current ratio plane, wherein when the ratio magnitude value and the angle difference value are outside the established region, the tripping is allowed, and wherein when the ratio magnitude value and the angle difference value are within the established region, the tripping is blocked.

11. The method of claim 1, wherein calculating the restraining current comprises performing one or more calculations selected from the group comprising:

summing absolute values of the three or more measured currents;

selecting a maximum value of the amplitudes of the three or more measured currents; and producing a product of amplitudes of the three or more measured currents.

12. A system for transformer differential protection, the system comprising:

a first terminal configured to measure a first plurality of currents flowing within a first set of windings of a transformer;

a second terminal configured to measure a second plurality of currents flowing within a second set of windings of the transformer; and a processor configured to:

compensate the first plurality currents based and the second plurality of currents based on their respective flows through either the first set of windings or the second set of windings, wherein the compensation is based on a model of an ideal current node, the model having equal current flow into and out of the current node under fault-free operation;

calculate a differential current comprising a sum of the compensated currents;

calculate a restraining current corresponding to the compensated currents;

augment the restraining current by adding a value to the restraining current, the value based on at least one of a magnetizing inrush current and overexcitation of the transformer;

calculate a complex current ratio corresponding to the plurality of compensated currents;

apply an alpha plane analysis to the complex current ratio; and selectively trip, based on the alpha plane analysis, a power apparatus that includes the transformer.

13. The system of claim 12, wherein at least one of the first terminal and the second terminal further comprises:

a voltage transformer to measure a voltage associated with the transformer.

14. The system of claim 12, wherein the first terminal is configured to transmit an indication of the first plurality of currents to the second terminal, wherein the second terminal is configured to transmit an indication of the second plurality of currents to the first terminal, and wherein the processor comprises a first processor located in the first terminal and a second processor located in the second terminal.

15. The system of claim 12, wherein the processor is configured to compensate the plurality of measured currents by:

performing ratio matching based on transformation ratios of the transformer and a connected current transformer; and performing zero-sequence removal and vector group compensation.

16. The system of claim 12, wherein the processor is configured to augment the restraining current by:

determining at least one harmonic of the differential current; and adding the at least one harmonic to the restraining current terms using one or more selected multipliers.

17. The system of claim 16, wherein the processor is configured to augment the restraining current based on the magnetizing inrush current of the transformer by:

adding a magnitude of at least one of a second and a fourth harmonic of the differential current to the restraining current using the one or more selected multipliers.

18. The system of claim 16, wherein the processor is configured to augment the restraining current based on the overexcitation of the transformer by:

adding a magnitude of a fifth harmonic of the differential current to the restraining current using the one or more selected multipliers.

19. The system of claim 12, wherein the processor is configured to augment the restraining current based on the overexcitation of the transformer by:

determining a voltage and a frequency applied to the transformer;

calculating a volts per hertz (V/Hz) ratio based on the determined voltage and frequency applied to the transformer;

comparing the V/Hz ratio to a threshold value; and in response to the comparison, selectively augmenting the restraining current by adding a value based on the V/Hz ratio to the restraining current.

20. The system of claim 19, wherein the first set of windings of the transformer are directly coupled to the first terminal, wherein the second set of windings of the transformer are coupled to the second terminal through a transmission line, wherein the second terminal is configured to measure a local voltage and a local current, and wherein the processor is configured to determine a remote voltage of the first terminal for use in the V/Hz ratio by calculating the remote voltage as being about equal to the measured local voltage minus a product of the measured local current and an impedance of the transmission line.

21. The system of claim 12, wherein the transformer is an in-line transformer of the power apparatus, wherein the power apparatus comprises a transmission line electrically connected to one of the sets of windings of the in-line transformer, wherein the processor is configured to:

determine a line charging current; and subtract the determined line charging current from the differential current.

22. The system of claim 12, wherein the processor is configured to calculate the complex current ratio by:

converting the differential current and the restraining current into a first equivalent current of an equivalent two-terminal power apparatus and a second equivalent current of the equivalent two-terminal power apparatus, wherein a sum of the first equivalent current and the second equivalent current substantially equals the calculated differential current corresponding to the compensated currents, and wherein values of the first equivalent current and the second equivalent current substantially yield the calculated restraining current corresponding to the compensated currents; and calculating a complex ratio of the first equivalent current and the second equivalent current.

23. The system of claim 22, wherein the processor is configured to apply the alpha plane analysis comprises:

calculating a magnitude value of the complex ratio of the first equivalent current and the second equivalent current;

calculating an angle difference value between the first equivalent current and the second equivalent current; and comparing the ratio magnitude value and the angle difference value against preselected values that establish a phase region in a current ratio plane, wherein when the ratio magnitude value and the angle difference value are outside the established region, the tripping is allowed, and wherein when the ratio magnitude value and the angle difference value are within the established region, the tripping is blocked.

24. The system of claim 12, wherein the processor is configured to calculate the restraining current by performing one or more calculations selected from the group comprising:

summing absolute values of the three or more measured currents;

selecting a maximum value of the amplitudes of the three or more measured currents; and producing a product of amplitudes of the three or more measured currents.

25. A system for transformer differential protection comprising:

means for measuring a plurality of currents corresponding to a first set of windings of a transformer and a second set of windings of the transformer;

means for compensating the plurality of measured currents based on their respective flows through either the first set of windings or the second set of windings, wherein the compensation is based on a model of an ideal current node, the model having equal current flow into and out of the current node under fault-free operation;

means for calculating a differential current comprising a sum of the compensated currents;

means for calculating a restraining current corresponding to the compensated currents;

means for augmenting the restraining current by adding a value to the restraining current, the value based on at least one of a magnetizing inrush current and overexcitation of the transformer;

means for calculating a complex current ratio corresponding to the plurality of compensated currents;

means for applying an alpha plane analysis to the complex current ratio; and means for selectively tripping, based on the alpha plane analysis, a power apparatus that includes the transformer.

26. A method for transformer differential protection comprising:

measuring a plurality of currents corresponding to a first set of windings of a transformer and a second set of windings of the transformer;

compensating the plurality of measured currents based on their respective flows through either the first set of windings or the second set of windings, wherein the compensation is based on a model of an ideal current node, the model having equal current flow into and out of the current node under fault-free operation;

calculating a differential current comprising a sum of the compensated currents;

calculating a restraining current corresponding to the compensated currents;

determining a voltage and a frequency applied to the transformer;

calculating a volts per hertz (V/Hz) ratio based on the determined voltage and frequency applied to the transformer;

comparing the V/Hz ratio to a threshold value;

in response to the comparison, selectively augmenting the restraining current by adding a value based on the V/Hz ratio to the restraining current; and selectively tripping a power apparatus that includes the transformer based on a line current differential analysis using the differential current and the augmented restraining current.

27. The method of claim 26, wherein the line current differential analysis comprises a percent differential analysis.

28. The method of claim 26, wherein the line current differential analysis comprises an alpha plane analysis.

29. The method of claim 28, wherein the alpha plane analysis comprises:

converting the differential current and the augmented restraining current into a first equivalent current of an equivalent two-terminal power apparatus and a second equivalent current of the equivalent two-terminal power apparatus, wherein a sum of the first equivalent current and the second equivalent current substantially equals the calculated differential current corresponding to the compensated currents, and wherein values of the first equivalent current and the second equivalent current substantially yield the calculated restraining current corresponding to the compensated currents; and calculating a complex ratio of the first equivalent current and the second equivalent current.

30. The method of claim 29, wherein the alpha plane analysis further comprises:

calculating a magnitude value of the complex ratio of the first equivalent current and the second equivalent current;

calculating an angle difference value between the first equivalent current and the second equivalent current; and comparing the ratio magnitude value and the angle difference value against preselected values that establish a phase region in a current ratio plane, wherein when the ratio magnitude value and the angle difference value are outside the established region, the tripping is allowed, and wherein when the ratio magnitude value and the angle difference value are within the established region, the tripping is blocked.

31. The method of claim 26, wherein determining the voltage comprises:

measuring a local voltage at a local terminal;

measuring a local current at the local terminal; and calculating a remote voltage corresponding to a remote terminal where the transformer is located, the remote voltage being about equal to the measured local voltage minus a product of the measured local current and an impedance of a transmission line between the local terminal and the remote terminal.

* * * * *